(12) United States Patent
Futami et al.

(10) Patent No.: US 8,179,926 B2
(45) Date of Patent: May 15, 2012

(54) MOBILE COMMUNICATION SYSTEM, AND BASE TRANSCEIVER STATION APPARATUS AND MOBILE STATION APPARATUS USED IN MOBILE COMMUNICATION SYSTEM

(75) Inventors: Tetsuhiro Futami, Kawasaki (JP); Morihiko Minowa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1002 days.

(21) Appl. No.: 11/311,564

(22) Filed: Dec. 19, 2005

(65) Prior Publication Data
US 2007/0058683 A1    Mar. 15, 2007

(30) Foreign Application Priority Data
Sep. 15, 2005   (JP) ................... 2005-268556

(51) Int. Cl.
*H04J 3/06* (2006.01)
*H04W 4/00* (2009.01)
*H04L 27/06* (2006.01)

(52) U.S. Cl. ........ 370/516; 370/350; 370/328; 370/338; 375/344

(58) Field of Classification Search .............. 370/310, 370/310.2, 328, 331, 338, 503, 516; 375/149, 375/344; 455/67.16, 263, 276.1
See application file for complete search history.

(56) References Cited

U.S. PATENT DOCUMENTS

| | | | | |
|---|---|---|---|---|
| 3,906,364 A * | 9/1975 | Dobson | .................. | 375/222 |
| 5,705,955 A * | 1/1998 | Freeburg et al. | ............... | 331/14 |
| 5,729,558 A * | 3/1998 | Mobin | .................. | 714/795 |
| 5,832,043 A * | 11/1998 | Eory | .................. | 375/344 |
| 5,884,178 A * | 3/1999 | Ericsson et al. | ............... | 455/441 |
| 5,943,606 A | 8/1999 | Kremm et al. | | |
| 6,259,919 B1 * | 7/2001 | Suonvieri et al. | ............... | 455/441 |
| 6,363,124 B1 * | 3/2002 | Cochran | ............... | 375/326 |
| 6,456,642 B1 * | 9/2002 | Hilliard | ............... | 372/55 |
| 6,456,671 B1 * | 9/2002 | Patire | ............... | 375/325 |
| 6,463,266 B1 * | 10/2002 | Shohara | ............... | 455/196.1 |
| 6,561,638 B1 * | 5/2003 | Iijima et al. | ............... | 428/32.31 |
| 6,628,926 B1 * | 9/2003 | van de Beek et al. | ........... | 455/75 |
| 6,631,174 B1 * | 10/2003 | Asahara et al. | ............... | 375/344 |
| 6,636,102 B1 * | 10/2003 | Brown et al. | ............... | 327/525 |
| 6,816,716 B2 * | 11/2004 | Shohara | ............... | 455/196.1 |
| 7,139,333 B2 * | 11/2006 | Tanada et al. | ............... | 375/316 |
| 7,162,002 B2 * | 1/2007 | Chen et al. | ............... | 375/376 |
| 7,257,150 B2 * | 8/2007 | Giancola et al. | ............... | 375/147 |

(Continued)

FOREIGN PATENT DOCUMENTS

CN    1245616    2/2000
(Continued)

OTHER PUBLICATIONS

Chinese Office Action dated May 22, 2009, from the corresponding Chinese Application.

(Continued)

*Primary Examiner* — Warner Wong
(74) *Attorney, Agent, or Firm* — Katten Muchin Rosenman LLP

(57) ABSTRACT

A phase error detector in a base transceiver station detects a phase error caused by a Doppler shift in a received wave from a mobile station. A phase rotator rotates a phase of a transmission symbol in a base band region so as to cancel the Doppler shift, which occurs in a downlink from a base transceiver station to a mobile station based on the phase error detected by the phase error detector.

23 Claims, 23 Drawing Sheets

U.S. PATENT DOCUMENTS

| | | | |
|---|---|---|---|
| 7,558,576 B2 * | 7/2009 | Chen et al. | 455/441 |
| 8,027,373 B2 * | 9/2011 | Subrahmanya et al. | 375/149 |
| 2001/0002913 A1 | 6/2001 | Khalifa et al. | |
| 2001/0040914 A1 * | 11/2001 | Kaewell | 375/147 |
| 2002/0105913 A1 * | 8/2002 | Miya | 370/241 |
| 2003/0142733 A1 * | 7/2003 | Boloorian | 375/148 |
| 2004/0013169 A1 * | 1/2004 | Kanemoto et al. | 375/147 |
| 2004/0171352 A1 | 9/2004 | Maeda et al. | |
| 2005/0233746 A1 * | 10/2005 | Laroia et al. | 455/436 |
| 2005/0243790 A1 * | 11/2005 | Mesecher et al. | 370/342 |
| 2007/0058708 A1 * | 3/2007 | Bultan et al. | 375/226 |

FOREIGN PATENT DOCUMENTS

| | | | |
|---|---|---|---|
| CN | 1430818 | | 7/2003 |
| CN | 1525654 | | 9/2004 |
| CN | 1525672 | | 9/2004 |
| FR | EP0848509 | * | 6/1998 |
| JP | 10-200471 | | 7/1998 |
| JP | 11-355826 | | 12/1999 |
| JP | 2001-308773 | | 11/2001 |
| JP | 2002-84209 | | 3/2002 |
| JP | 2002-101012 | | 4/2002 |
| JP | 2002-330068 | | 11/2002 |
| KR | 2000-0049035 | | 7/2000 |
| WO | 98/15070 | | 4/1998 |
| WO | 98/24251 | | 6/1998 |
| WO | 01/73968 | | 10/2001 |
| WO | 2007/015394 | | 2/2007 |

OTHER PUBLICATIONS

Chinese Second Office Action dated Aug. 24, 2010, from the corresponding Chinese Application.

Notice of Rejection Grounds dated Aug. 31, 2010, from the corresponding Japanese Application.

Korean Office Action dated Feb. 27, 2008, from the corresponding Korean Application (with partial translation).

Korean Office Action dated May 15, 2007, from the corresponding Korean Patent Application.

Haifeng Wang, et al. "Adaptive Closed-Loop Frequency Compensation for Multicarrier Transmissions" IEEE, 2004, pp. 618-622.

* cited by examiner

F I G. 6 A
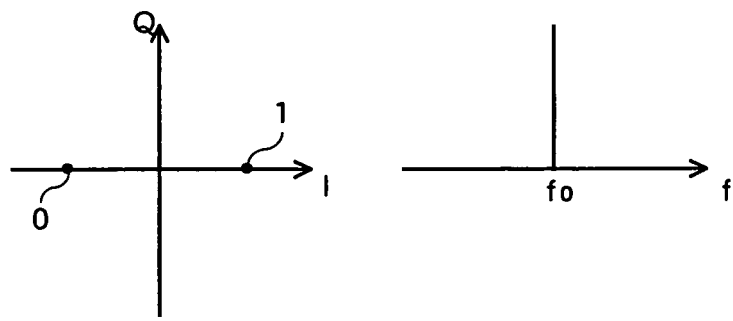
F I G. 6 B
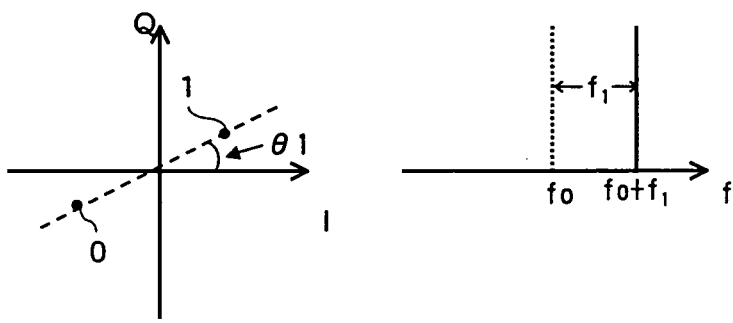
F I G. 6 C
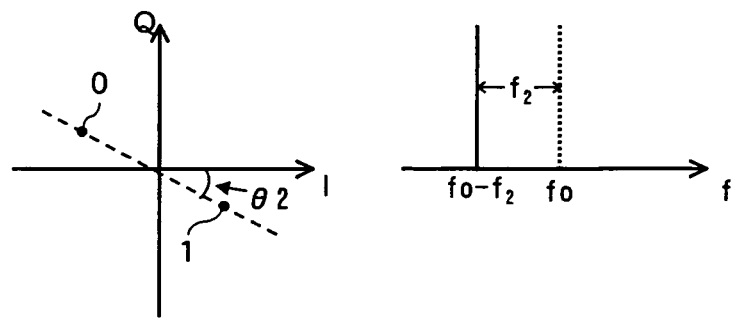

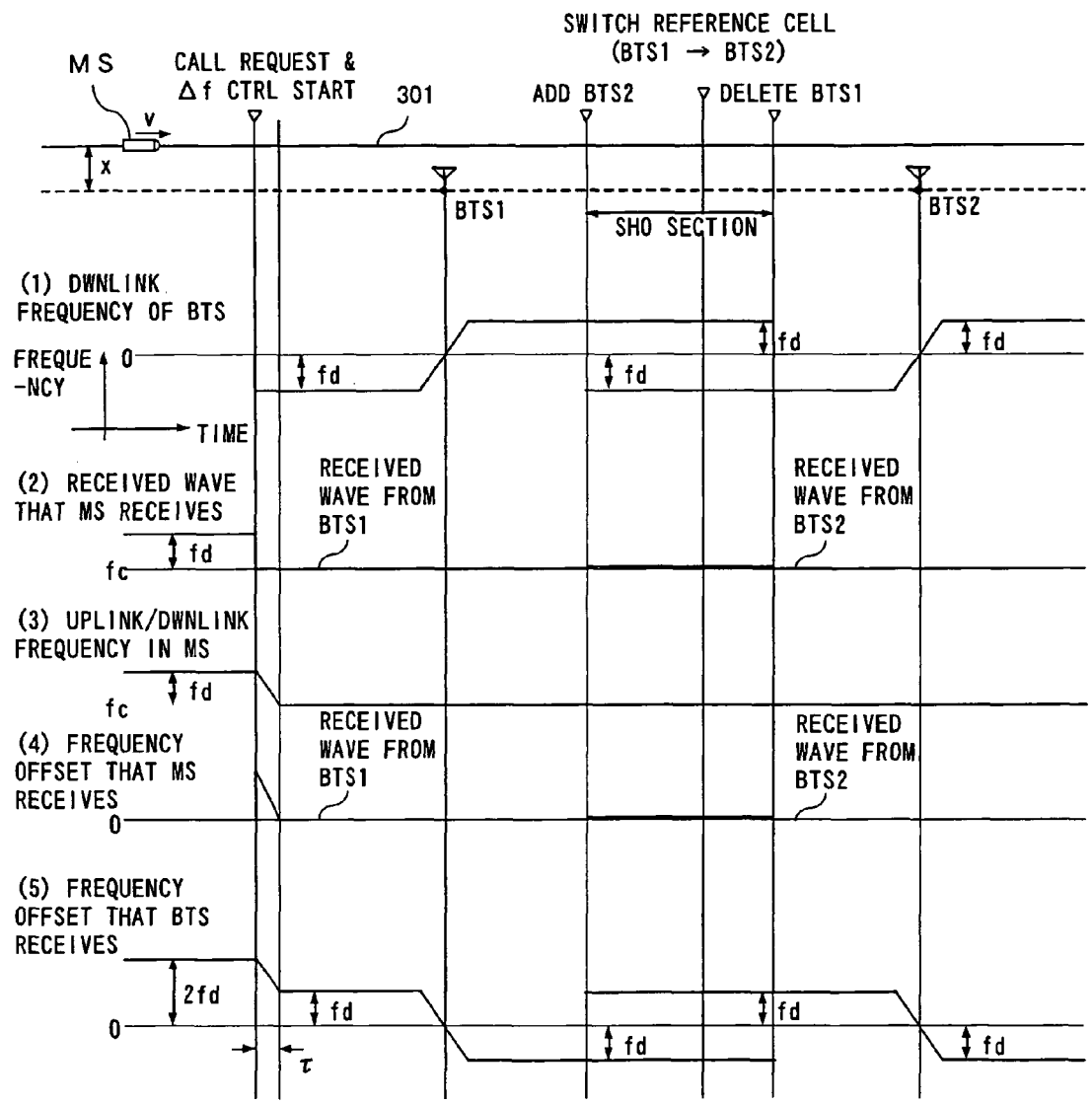
F I G. 7

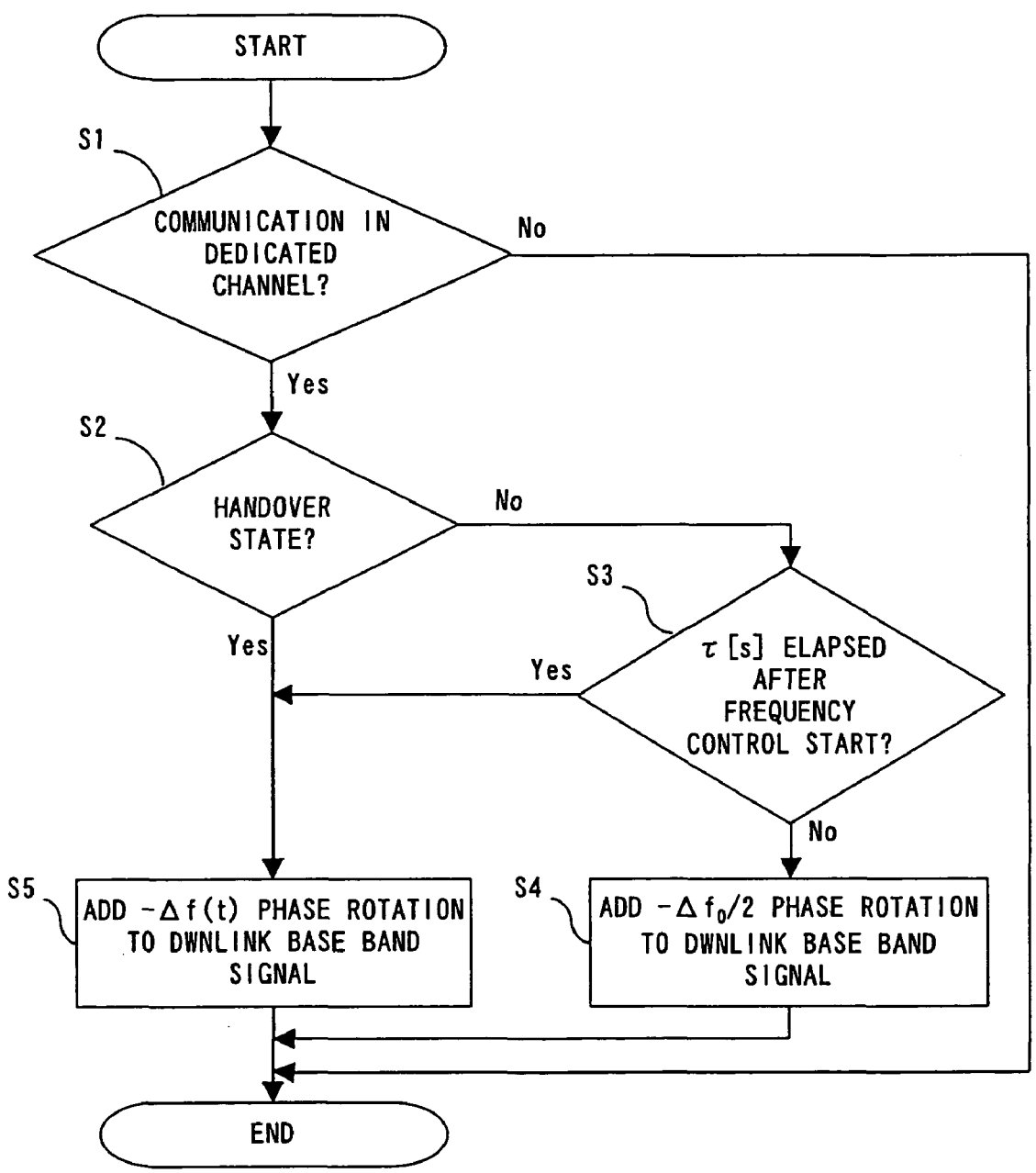
F I G. 8

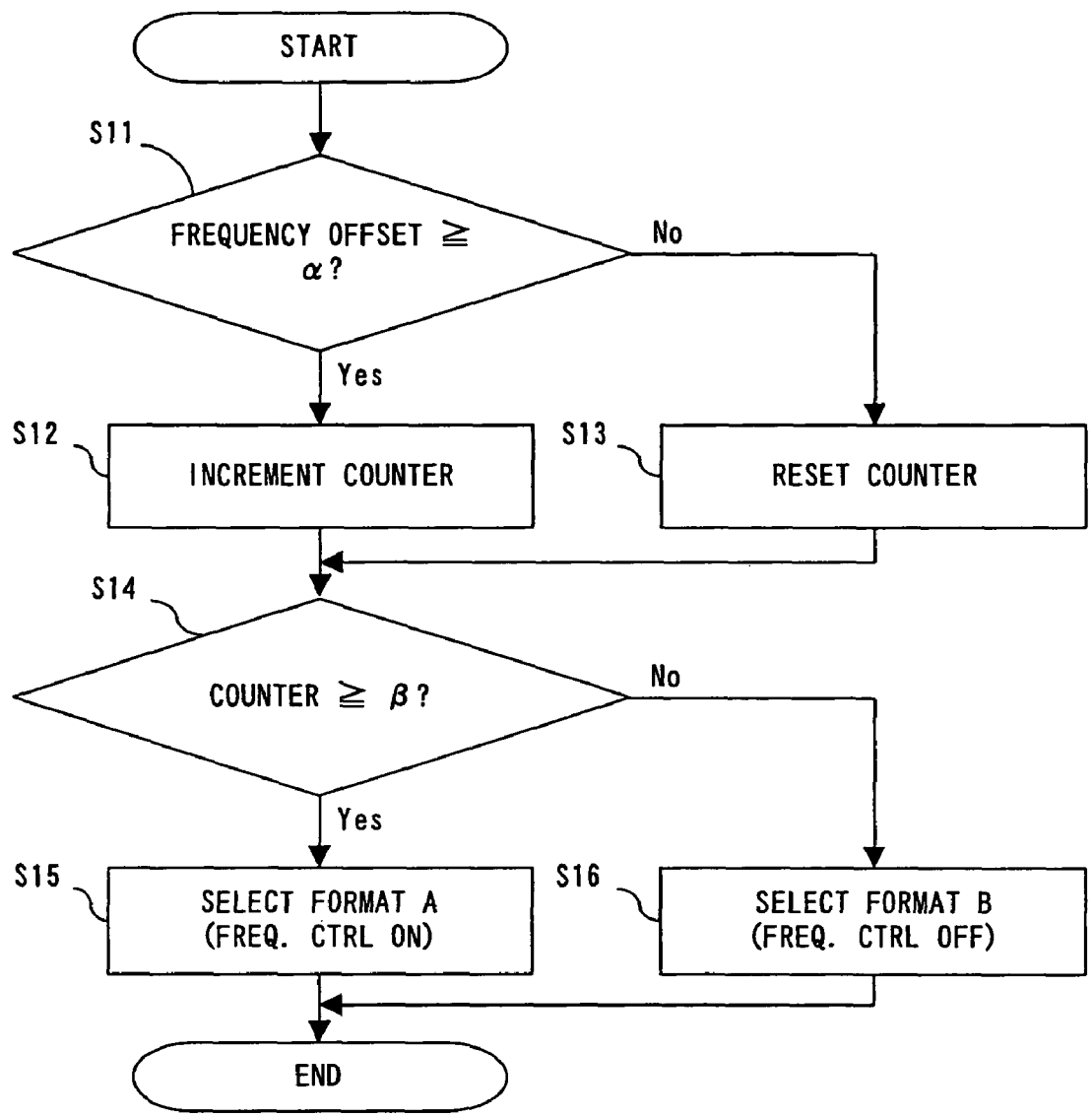
F I G. 1 1

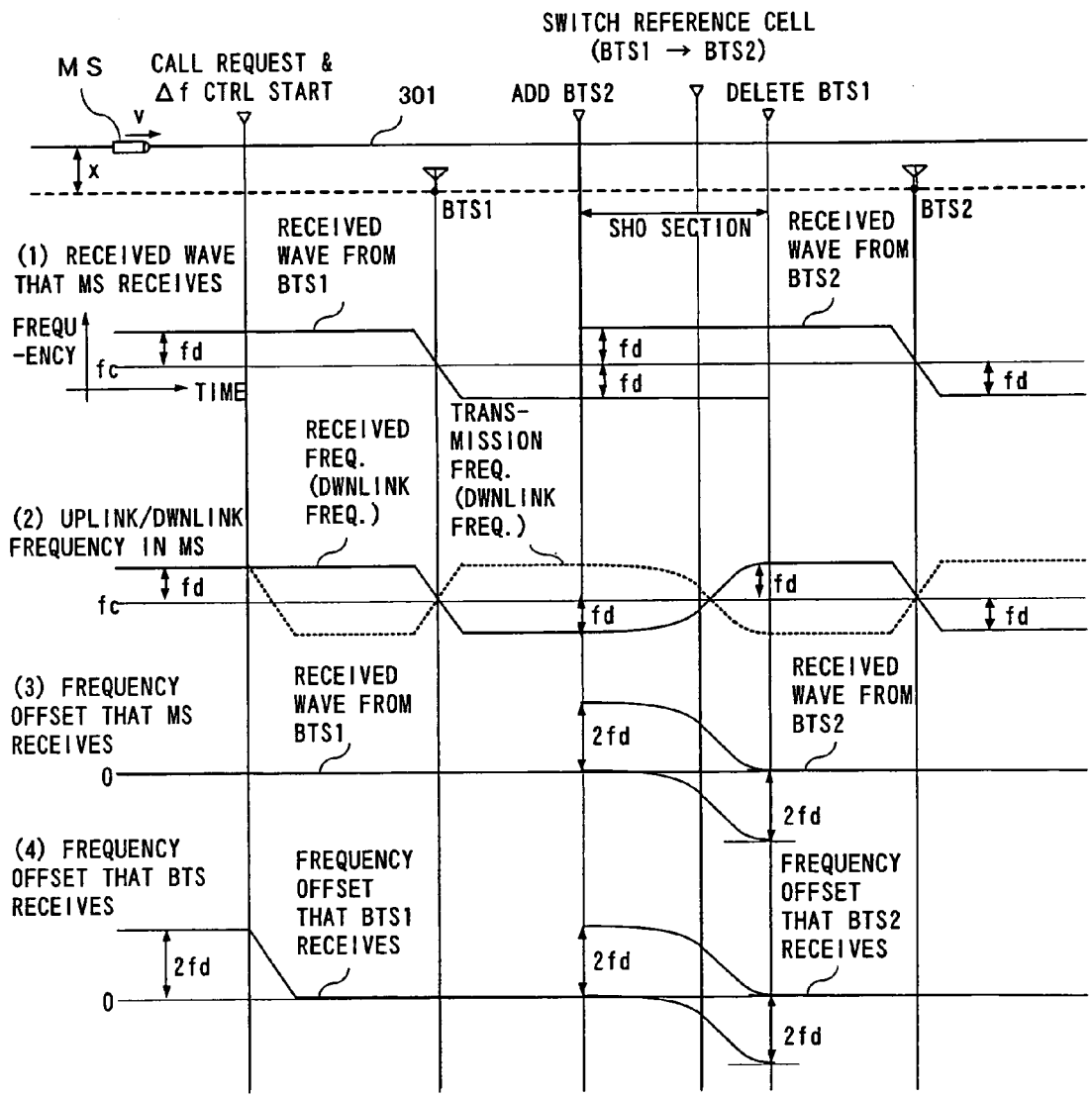
F I G. 1 4

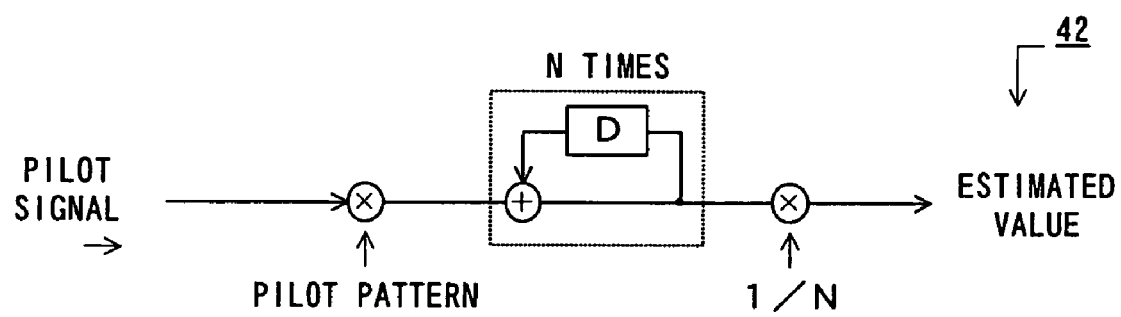
F I G. 2 0

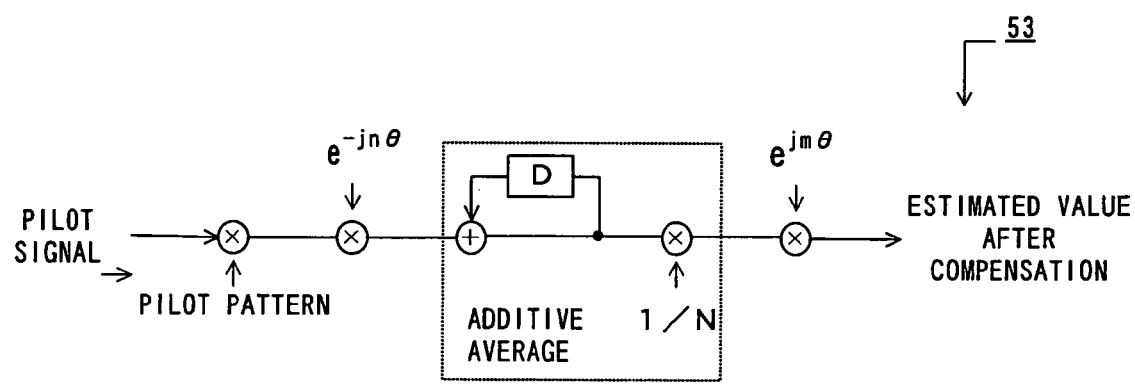
F I G. 2 3

MOBILE COMMUNICATION SYSTEM, AND BASE TRANSCEIVER STATION APPARATUS AND MOBILE STATION APPARATUS USED IN MOBILE COMMUNICATION SYSTEM

BACKGROUND OF THE INVENTION

1. Field of the Invention

The present invention relates to a mobile communication system, and specifically relates to a mobile communication system, base transceiver station apparatus, and mobile station apparatus, which comprise a function for compensating for a Doppler shift.

2. Description of the Related Art

As is well known, a Doppler shift caused by the Doppler effect occurs in mobile communication systems. That is, as a mobile station moves in a direction, which shortens the distance between the mobile station and a base transceiver station, the signal frequency received by a receiving station (either one of the mobile station or based transceiver station) is higher than the signal frequency transmitted from a transmitting station (the other one of mobile station or base transceiver station). Contrary, as the mobile station moves in a direction, which elongates the distance between the mobile station and a base transceiver station, the signal frequency received by a receiving station is lower than the signal frequency transmitted from a transmitting station. For this effect, the receiving station has to absorb or compensate for the Doppler shift and regenerate a signal.

FIG. 1 is a diagram describing a configuration of a conventional mobile communication system. In this description, an operation and a configuration relating to the Doppler shift are explained.

A base transceiver station 500 comprises an antenna element 501, a separator (circulator) 502, an orthogonal demodulator 503, a Voltage Control Oscillator (VCO) 504, an uplink frequency synthesizer 505, a phase error detector 506, a synchronous detector 507, a demodulator 508, a encoder 509, a frame generator 510, a multiplexer 511, a downlink frequency synthesizer 512 and a orthogonal modulator 513. The base transceiver station 500 transmits data to a mobile station 600 in a prescribed unique wireless frequency using the VOC 504 and the downlink frequency synthesizer 512. The base transceiver station 500 detects a frequency error (a frequency offset) of received wave from the mobile station apparatus 600 using the phase error detector 506, and regenerates data compensating for the error.

The mobile station apparatus 600 comprises an antennal element 601, a separator (circulator) 602, a orthogonal demodulator 603, a synchronous detector 604, a decoder 605, a handover controller 606, a phase error detector 607, an Automatic Frequency Control (AFC) unit 608, a VOC 609, a downlink frequency synthesizer 610, an encoder 611, a frame generator 612, an uplink frequency synthesizer 613, and an orthogonal modulator 614. The AFC unit 608 controls input voltage of the VOC 609 so that the frequency error (frequency offset) of the received wave from the base transceiver station apparatus 500 converges on zero. The mobile station apparatus 600 regenerates the received data and performs data transmission using a clock generated by the VOC 609. That is to say, the mobile station apparatus 600 uses the same clock for both regenerating data and transmitting data.

Here, assume there is an environment in which a mobile station moves at a high speed on a train (particularly in a train such as a bullet train traveling at a high speed) or in a car, and a base transceiver station is located in a place where the radio path between the mobile station and the base transceiver station along a traveling route of the train or the car is under a line of sight (LOS) condition (a place where direct waves are transmitted and received between the mobile station and the base transceiver station). Under such an environment, the frequency control in a conventional mobile communication system is performed as shown in FIG. 2. In FIG. 2, uplink/downlink frequencies are not distinguished but are described as "fc" in order to simplify the explanation; however, a problem described below also occurs even if the uplink and downlink frequencies are different from each other.

In a path under the LOS condition, because a mobile station and a base transceiver station individually receive direct waves, the Doppler shift equals to the frequency offset. Therefore, the mobile station has to perform AFC, which keeps up with wireless frequency including the Doppler shift.

In FIG. 2, when a mobile station (MS) approaches to a base transceiver station (BTS1), the frequency of received wave on the antenna in the MS is higher by the amount of the Doppler shift. Therefore, as a result of AFC on the received wave, the frequency (downlink frequency) of a periodic wave used in the mobile station to receive a signal is controlled by "fc+fd". Here, "fc" is a reference frequency of a carrier wave, and "fd" is a Doppler shift frequency. When an ideal AFC is performed, the frequency offset that the mobile station receives after an orthogonal modulation becomes zero.

In this example, as explained with reference to FIG. 1, the same frequency as the downlink frequency obtained from the AFC is used as a frequency of a carrier wave for data transmission (uplink frequency) in the conventional mobile communication system. Therefore, the uplink frequency is also controlled at "fc+fd". When a radio wave with the frequency "fc+fd" is transmitted from the mobile station, the Doppler shift is also added to the uplink as well, and consequently, the frequency of the received wave in the base transceiver station (BTS1) becomes "fc+2fd". In other words, the frequency offset after the orthogonal modulation in the base transceiver station is twofold of the Doppler shift.

When the mobile station (MS) passes in proximity of the base transceiver station (BTS1), a state in which the mobile station approaches to the base transceiver station changes into a state in which the mobile station recedes from the base transceiver station, and therefore, the polarity of the Doppler shift can be inverted within a short time period. At that time, the fluctuation in the Doppler shift fd can be expressed by the following equation where "v" represents a moving velocity of the mobile station, "c" is speed of light, "x" is a vertical distance from the base transceiver station (BTS1) to the traveling route of the mobile station, "t" is a elapsed time on the basis of the time when the mobile station passes in proximity of the base transceiver station (BTS1), and "θ(t)" is an elevation angle when the base transceiver station (BTS1) is seen from the traveling direction of the mobile station.

$$fd = fc \times \frac{v}{c} \cos\theta(t) = fc \times \frac{v}{c} \times \frac{|vt|}{\sqrt{x^2 + v^2 t^2}}$$

FIG. 3 is diagram showing fluctuation in the Doppler shift obtained by the above equation. As the moving velocity of the mobile station increases, the fluctuation range of the Doppler shift becomes wider. As the vertical distance from the base transceiver station to the moving route of the mobile station is smaller, the Doppler shift fluctuates within a shorter time period.

For example, when fc=2 GHz, v=300 km/h, and x=50 m, the received frequency of the mobile station drastically fluctuates from "2 G+600" Hz to "2 G−600" Hz within a several seconds, and therefore, in order to minimize the frequency offset in the mobile station, the time constant of the AFC has to be set at high speed. However, if the time constant of the AFC is set at high speed, the average time of the phase error detection is short with respect to noise and control steps of the frequency control is inexact. That is to say, increase in speed of the AFC and the accuracy of the frequency control are in a tradeoff relation.

In order to solve this problem, Patent Document 1 (Japanese Patent Application Laid-open Publication No. 2002-101012) for example suggests a technology to make the AFC band and tracking speed variable in accordance with the communication conditions. However, by introducing this configuration, another problem rises that the AFC circuit in a mobile station becomes more complicated.

In addition, even if the AFC in the mobile station is performed as desired, the base transceiver station receives a frequency offset equivalent to twofold of the Doppler shift. For that reason, in the above case, the received frequency in the base transceiver station fluctuates by 2400 Hz from "2 G+1200" Hz to "2 G−1200" Hz within a several seconds. Consequently, the requirement of increase in the speed in the frequency compensation in the base transceiver station (frequency compensation processing in synchronous detection based on the result of phase error detection) is further difficult than the conditions in the mobile station.

However, in general, the base transceiver station is designed to compensate for a frequency error of only 0.1 ppm caused by the frequency stability of the mobile station. Here, when fc=2 GHz, the frequency error that can be compensated is as much as ±200 Hz. Therefore, in order to secure the reception quality under specific conditions that is an environment of high-speed moving in a path under LOS condition, the base transceiver station must be implemented with a frequency compensation circuit with the compensation range six times as wide as a usual design. Additionally, in order to realize the high-speed tracking, the frequency compensation accuracy has to be sacrificed.

In FIG. 2, assume a handover caused when a mobile station (MS) moves from a communication area of a base transceiver station (BTS1) to a communication area of another base transceiver station (BTS2). In this description, the assumed handover is a soft handover (SHO) in CDMA employed by the second generation and the third generation cellular phone systems. In the CDMA, the same frequency can be used in cells adjacent to each other. Therefore, the mobile station can switch reference cells, synthesizing signals from a plurality of base transceiver stations at the maximum ratio (i.e. soft handover).

However, a conventional mobile station (MS) can perform the AFC on only one received frequency. For that reason, the mobile station generally performs the AFC on the received frequency of a reference cell alone. Then, as shown in FIG. 2, uplink/downlink frequency is controlled at "fc−fd" while the base transceiver station (BTS1) is the reference cell, and the uplink/downlink frequency is controlled at "fc+fd" after the reference cell is changed from the base transceiver station (BTS1) to the base transceiver station (BTS2). In other words, the mobile station synthesizes a pair of received waves with a frequency difference equivalent to twofold of the Doppler shift at the maximum ratio in the handover area. As a result, in addition that diversity gain by the soft handover cannot be obtained, it is possible that the reception quality is more deteriorated than the reception quality when the synthesize is not performed.

Another mobile communication system regarding to the Doppler shift is described in Patent Document 2 (Japanese Patent Application Laid-open Publication No. H10-200471), for example. A technology relating to the AFC in handover is described in Patent Document 3 (Japanese Patent Application Laid-open Publication No. H11-355826), for example.

SUMMARY OF THE INVENTION

It is an object of the present invention to provide a mobile communication system in which stable reception quality can be secured in transmitter station and/or receiver station under environment of high-speed traveling.

The base transceiver station apparatus of the present invention transmits/receives radio wave to/from a mobile station, comprising: a detection unit for detecting a frequency offset of a received wave from the mobile station; and a frequency control unit for controlling transmission frequency of a carrier wave for transmitting a signal to the mobile station so as to cancel a Doppler shift, which occurs in a radio link connecting to the mobile station, based on the frequency offset detected by the detection unit.

The Doppler shift caused by a mobile station moving at a high speed occurs both in the uplink and downlink, and therefore, the frequency offset, which is twofold of the Doppler shift, occurs in the conventional mobile communication system. By introducing the base transceiver station of the present invention, however, the Doppler shift in the downlink is cancelled. Thus, the frequency offset can be controlled to be equivalent to the Doppler shift.

The mobile station apparatus of the present invention transmits/receives a radio wave to/from a base transceiver station, comprising: a reception unit for receiving frequency control information generated based on a frequency offset of a received wave in the base transceiver station; and a frequency control unit for controlling a transmission frequency of a carrier wave for transmitting a signal to the base transceiver station so as to cancel the frequency offset of the received wave in the base transceiver station based on the frequency control information.

By introducing the mobile station apparatus of the present invention, the Doppler shift in the uplink is cancelled, and therefore, the frequency offset in the base transceiver station apparatus becomes zero. On the other hand, if the mobile station apparatus has a function for performing automatic frequency control to follow the Doppler shift, the frequency offset does not occur in the mobile station apparatus. In such a case, the frequency offsets can be controlled to zero in both the base transceiver station and the mobile station.

According to the base transceiver station apparatus and the mobile station apparatus with the above configurations, the influence of the Doppler shift can be avoided or suppressed, it is possible to secure stable communication quality in a high-speed moving environment.

The mobile communication system of the present invention having a mobile station and a plurality of base transceiver stations, comprising: a generation unit, provided in each of the base transceiver stations, for generating frequency control information based on a frequency offset of a received wave from the mobile station; and a frequency control unit, provided in the mobile station, for controlling a transmission frequency for transmitting a signal to a base transceiver station based on the frequency control information generated in at least one of the plurality of base transceiver stations. When the mobile station is in a handover state, the frequency control unit may control the transmission frequency based on frequency control information form a base transceiver station with the best reception quality. In addition, the frequency control unit may combines frequency control information from each of base transceiver stations using reception quality of a signal from each of the base transceiver stations as weights, and controls the transmission frequency based on the weighted combination result.

According to the above mobile communication system, it is possible to realize a preferable frequency control even in a handover state where a mobile station moves at high-speed.

According to the present invention, a transmission frequency is controlled so as to cancel the Doppler shift caused in a radio link or to cancel the frequency offset in a receiving station, the reception quality in both a transmitting station and a receiving station can be improved in a high-speed moving environment. By so doing, it is possible to acquire stable communication quality in both uplink and downlink.

BRIEF DESCRIPTION OF THE DRAWINGS

FIG. 6A-FIG. 6C are diagrams explaining the operation of the phase rotator;

FIG. 7 is a diagram explaining the frequency control in the mobile communication system of the first embodiment FIG. 8 is a flowchart showing an operation of the phase rotator;

FIG. 11 is a flowchart showing an operation of the frame generator;

FIG. 14 is a diagram (2) explaining the frequency control in the mobile communication system of the second embodiment;

FIG. 20 is an example of the propagation path estimation unit used in the fifth embodiment;

FIG. 23 is an example of the propagation path estimation unit used in the seventh embodiment.

DESCRIPTION OF THE PREFERRED EMBODIMENTS

Embodiments of the present invention are explained with reference to the drawings. In the following description, a path for transmitting a signal from a mobile station to a base transceiver station is referred to as "uplink" and a path for transmitting a signal from a base transceiver station to a mobile station is referred to as "downlink".

First Embodiment

Figure 4:
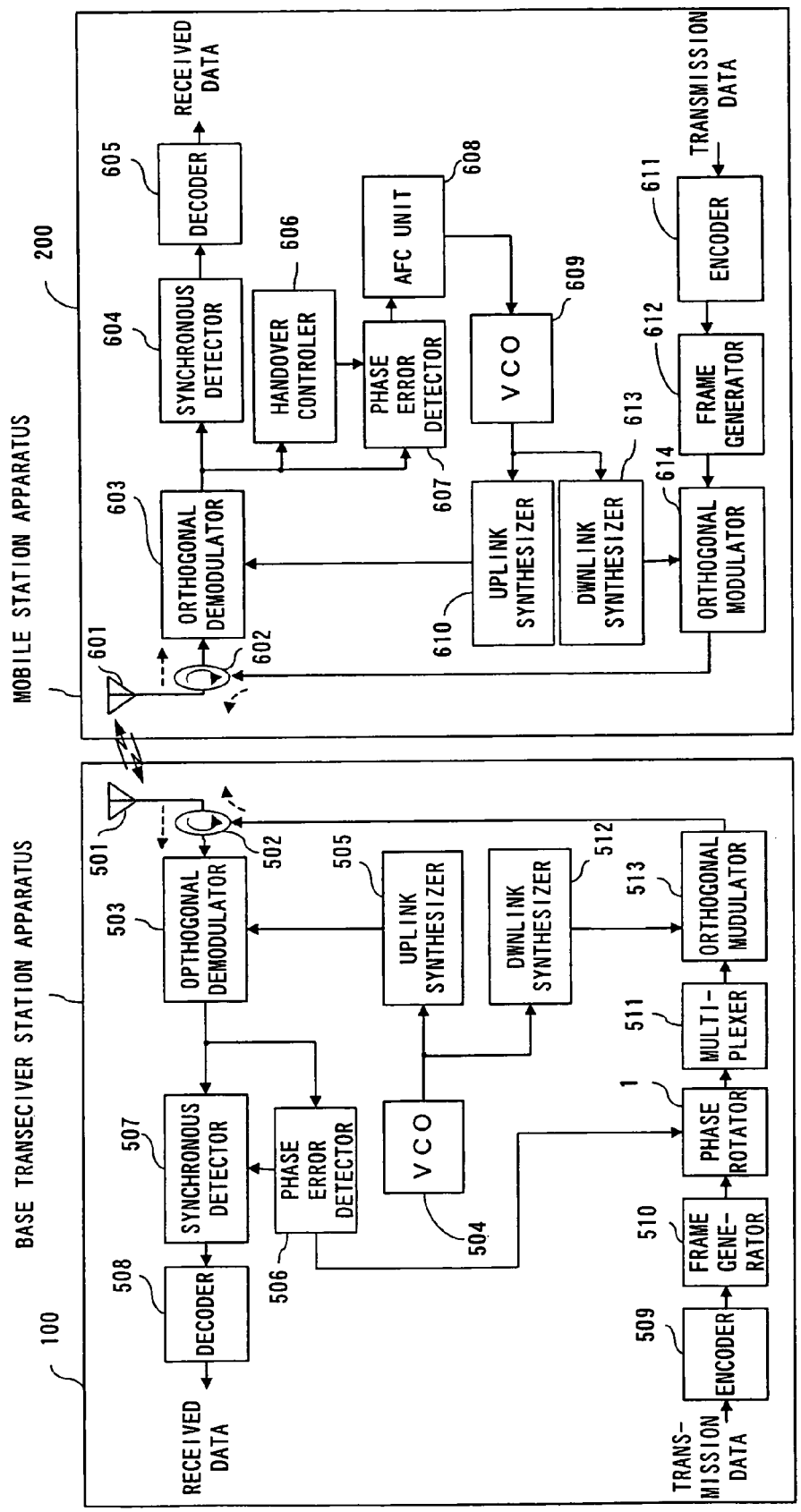
FIG. 4 is a diagram showing a configuration of a mobile communication system of the first embodiment.

FIG. 4 is a diagram showing a configuration of a mobile communication system of the first embodiment. In FIG. 4, a base transceiver station apparatus 100 comprises a phase rotator 1 in addition to the antenna element 501, the separator (circulator) 502, the orthogonal demodulator 503, the Voltage Control Oscillator (VCO) 504, the uplink frequency synthesizer 505, the phase error detector 506, the synchronous detector 507, the decoder 508, the encoder 509, the frame generator 510, the multiplexer 511, the downlink frequency synthesizer 512, and the orthogonal modulator 513.

The received signal input via the antenna element 501 is down-converted into a base band signal in the orthogonal demodulator 503 after being separated from the transmission signal by the circulator 502. Here, the VCO 504 generates a reference clock, and the uplink frequency synthesizer 505 generates a periodic wave with a predetermined frequency unique to the system (a sinusoidal wave, for example) from the reference clock under PLL control. The orthogonal demodulator 503 obtains the base band signal by multiplying the periodic wave on the received signal.

The phase error detector 506 detects the frequency offset (i.e. the error between the reference frequency in the base transceiver station apparatus 100 and the frequency of the received wave from the mobile station apparatus 200) by taking time correlation of a given signal (a pilot signal) multiplexed on the base band signal in advance. The frequency offset can be detected for each mobile station.

The synchronous detector 507 calculates an estimated value of a path fluctuation by in-phase addition of the pilot signal, while compensating for the above frequency offset. A complex conjugate, which is a result of the addition of phase rotation equivalent to the frequency offset to the estimated value, is calculated, then the above base band signal is multiplied by the complex conjugate. By so doing, the phase rotation attributed to the phase rotation occurred in the propagation path and the frequency offset is compensated for.

The decoder 508 performs decoding processing such as de-interleaving and error correction decoding on the received symbol after the synchronous detection, and the regenerated data series is output.

Meanwhile, the following is the modulation processing for transmitting data. That is, the encoder 509 performs encoding processing such as error correction encoding and interleaving to transmission data series for each mobile station. The frame generator 510 performs time-multiplexing of the encoded data in a prescribed frame format. The phase rotator 1 rotates the phase of the base band signal output from the frame generator 510 in accordance with the instruction from the phase error detector 506 for each mobile station of transmission destination. The multiplexer 511 sums the output signals of the phase rotator 1. The base band signal after multiplexing is up-converted into RF band in the orthogonal modulator 513, and sent out via the antenna element 501 while being separated from the received signal by the circulator 502. Here, the carrier wave used for the up-conversion is generated by the VCO 504 and the downlink frequency synthesizer 512. In a TDD (Time Division Duplex) system, the radio frequencies of the uplink and downlink are the same, and in a FDD (Frequency Division Duplex) system, the radio frequencies of uplink and downlink are separated from each other by a prescribed band.

Figure 5:
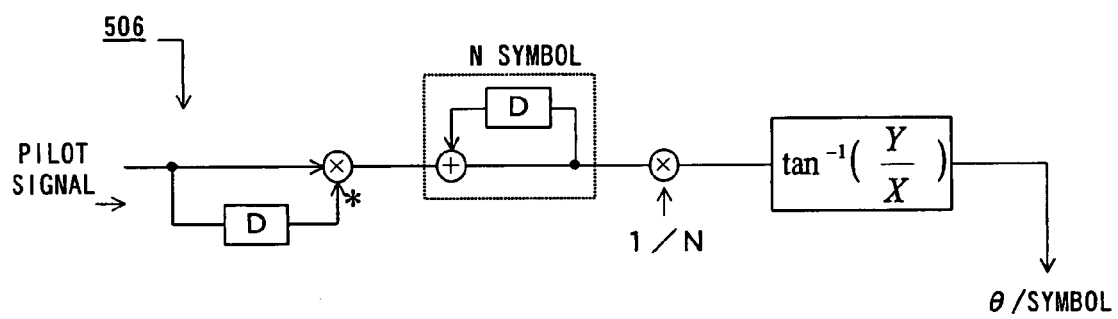
FIG. 5 is a diagram showing an example of the phase error detector.

FIG. 5 is a diagram showing an example of the phase error detector 506. A pilot signal is input in the phase error detector 506. First, the correlation between the adjacent symbols (i.e. time correlation) is calculated. Next, an average of correlation value for N symbols is calculated. By performing arctangent calculation on the average value, the phase error θ per one symbol can be obtained.

FIG. 6A to FIG. 6C are diagrams explaining the operation of the phase rotator 1. Here, assume that data is transmitted by BPSK modulation. "0" or "π" is assigned to each symbol (1 or 0) as shown in FIG. 6A. The modulated data is transmitted by a carrier wave with frequency $f_0$.

AS shown in FIG. 6B, when a phase θ1 (θ1>0) is added to the phase of the transmission symbol in the base band region, the spectrum of the carrier wave shifts by the frequency $f_1$ corresponding to the phase θ1. In other words, the frequency of the carrier wave practically becomes "$f_0+f_1$". On the other hand, as shown in FIG. 6C, when the phase θ2 (θ2<0) is added to the phase of the transmission symbol in the base band region, the spectrum of the carrier wave shifts by the frequency $f_2$ corresponding to the phase θ2. In other words, the frequency of the carrier wave practically becomes "$f_0-f_2$". As clear from the above, rotating the phase of the transmission symbol in the base band region is equivalent to shifting the frequency of the carrier wave.

The phase rotator 1 rotates the phase of the transmission symbol in the base band region in accordance with the instruction from the phase error detector 506. As a result, the transmission frequency of the carrier wave is controlled in accordance with the frequency offset. Here the phase error detector 506 detects the frequency offset of received waves from each mobile station, and the phase rotator 1 can control the transmission frequency of the carrier wave for each mobile station.

The reference goes back to FIG. 4. A mobile station apparatus 200 is basically the same as the mobile station 600 shown in FIG. 1, comprising an antenna element 601, a separator (circulator) 602, an orthogonal demodulator 603, a synchronous detector 604, a decoder 605, a handover controller 606, a phase error detector 607, an Automatic Frequency Control (AFC) unit 608, a VCO 609, a downlink frequency synthesizer 610, an encoder 611, a frame generator 612, an uplink frequency synthesizer 613, and an orthogonal modulator 614. Here, the operations of the devices other than the AFC unit 608, the synchronous detector 604, and the handover controller 606 are basically the same as those of the base transceiver station 100, and therefore the explanation of those devices is omitted.

The AFC unit 608 controls the input voltage of the VCO 609 so that the frequency offset detected by the phase error detector 607 converges on zero. In other words, the training operation on the frequency is performed so that the downlink frequency of the mobile station 200 (the frequency of a periodic wave given from the downlink frequency synthesizer 610 to the orthogonal modulator 603) matches to the frequency of the received wave from the base transceiver station 100. As a result of the above AFC, ideally, the frequency offset of the base band signal is zero. Therefore, the synchronous detector 604 compensates for only phase rotation caused in a propagation path based on the estimated value of the propagation path.

In either system of TDD or FDD, the relation between uplink/downlink frequencies are fixed. Therefore, in the AFC in general, the reference clock that a VCO (the VCO 609 in the embodiments) generates is provided to both uplink and downlink frequency synthesizers (610 and 613). In other words, the AFC is performed on the uplink and downlink frequencies at the same time.

The handover controller 606 measures the reception quality for each base transceiver station (reception power, reception SIR etc.) using the orthogonal demodulated data of the control signal transmitted from the base transceiver station connected to the mobile station and its adjacent base transceiver stations. Following the movement of the mobile station, a switch (handover) of a base transceiver station (a reference cell), which has the best reception quality, is constantly performed as needed. During handover, signals from a plurality of base transceiver stations are simultaneously received. At that time, the phase error detector 607, by being informed of the ID of the reference cell from the handover controller 606, detects the frequency offset to the received wave of the reference cell. Therefore, during the handover, the AFC is performed to the received wave from a base transceiver station of the reference cell.

In the mobile communication system with the above configuration, the phase rotator 1 in the base transceiver station 100 performs phase rotation of the downlink frequency so that the Doppler shift generated in the downlink from the base transceiver station apparatus 100 to the mobile station apparatus 200 is canceled, based on the frequency offset detected by the phase error detector 506. Practically, the phase rotation is performed to each symbol in the downlink by performing a complex multiplication of the opposite phase of the phase equivalent to the detected frequency offset. For example, when the phase error corresponding to the frequency offset detected by the phase error detector 506 is "θ1", the phase of each symbol of downlink is rotated by "−θ1".

The above phase rotation is performed for each transmission destination (i.e. mobile station). For that reason, processing for canceling the frequency offset is performed on each of dedicated channels. In other words, downlink frequency control in the base transceiver station 100 is started after the start of communication in dedicated channels caused by the call request from the mobile station.

FIG. 7 is a diagram explaining the frequency control in the mobile communication system of the first embodiment. Here, a mobile station (MS) moves along a path 301 at velocity v, and passes near a base transceiver station (BTS1) and a base transceiver station (BTS2). It is assumed that the vertical distance from the base transceiver station (BTS1) and the base transceiver station (BTS2) to the path 301 is "x", respectively. In addition, the system-specific carrier wave frequency is $f_0$.

In the system of the first embodiment, each base transceiver station detects the frequency offset caused by the Doppler shift, and controls the downlink transmission frequency based on the frequency offset. The mobile station does not have to comprise any special function for the frequency control of the present invention.

In FIG. 7, each base transceiver station periodically broadcasts a control signal using a common channel. The mobile station performs AFC to the received wave in the common channel from the base transceiver station (BTS1) before call request to use of a dedicated channel. At that time, the frequency of the received wave detected by the mobile station is "fc+fd". "fd" is a frequency caused by the Doppler shift. Then, by the AFC, the transmission frequency for returning a response signal from the mobile station to the base transceiver station (BTS1) is also "fc+fd". The frequency of the received wave detected by the base transceiver station (BTS1) is "fc+2fd". In other words, the frequency offset $\Delta f_0$ in the base transceiver station (BTS1) is "2fd". Therefore, the base transceiver station (BTS1), when detecting the call request from the mobile station, first starts the frequency control by adding the phase rotation equivalent to "$-\Delta f_0/2$ (=-fd)" to the downlink base band signal. That is, the base transceiver station (BTS1) transmits the downlink signal at the frequency equivalent to "fc-fd".

By so doing, the Doppler shift frequency is added on the downlink, and therefore, the frequency of the received wave in the mobile station becomes "fc". In other words, the Doppler shift fd is cancelled. The mobile station, after starting the communication in a dedicated channel, performs the AFC over the received wave of the dedicated channel. Therefore, the uplink frequency and the downlink frequency in the mobile station converge on "fc" within the time period equivalent to the time constant of the AFC. As a result, the frequency offset, which the mobile station receives, becomes zero, and an ideal reception environment is realized.

The Doppler shift for one way (i.e. fd) remains in the received wave of the base transceiver station; however, compared to the case that the frequency control of the first embodiment is not performed, the frequency offset is suppressed by half.

Suppose the convergence time of the AFC is "$\tau$(second)", the base transceiver station continues the frequency control for adding "$-\Delta f_0/2$" to the carrier wave frequency fc for the time period from the start of the frequency control to elapse of "$\tau$". After the elapse of "$\tau$", the frequency control is switched to a dynamic frequency control for adding "$-\Delta f(t)$" to the carrier wave frequency fc. Here, the "$-\Delta f(t)$" is a frequency corresponding to the phase error periodically detected by the phase error detector 506. In other words, the base transceiver station adds the phase rotation equivalent to "$-\Delta f(t)$", which dynamically changes in accordance with the movement of the mobile station, to the transmission symbol. Therefore, as shown in FIG. 7, even when the polarity of the Doppler shift changes at the time the mobile station passes near the base transceiver station (BTS1), the transmission frequency of the base transceiver station can keep up with the change, and consequently, it is possible to maintain the frequency offset in the mobile station at zero.

In a section where the mobile station (MS) recedes from the base transceiver station (BTS1) and approaches to the base transceiver station (BTS2), the base transceiver station (BTS1) and the base transceiver station (BTS2) are in the soft handover state. Then, the base transceiver station (BTS2) starts the frequency control using "$-\Delta f(t)$". At that time, the frequency control is performed by the base transceiver station (BTS1); therefore, the transmission frequency of the mobile station is maintained at "fc". For that reason, the frequency offset in the base transceiver station (BTS2) is equivalent to the Doppler shift (i.e. fd) caused by propagation in one way. The base transceiver station (BTS2) adds the phase rotation that cancels the Doppler shift (fd) to the downlink base band signal. Therefore, in the mobile station, the frequency offset is controlled to zero in the received wave from the base transceiver station (BTS2), like the received wave from the base transceiver station (BTS1).

Figure 2:
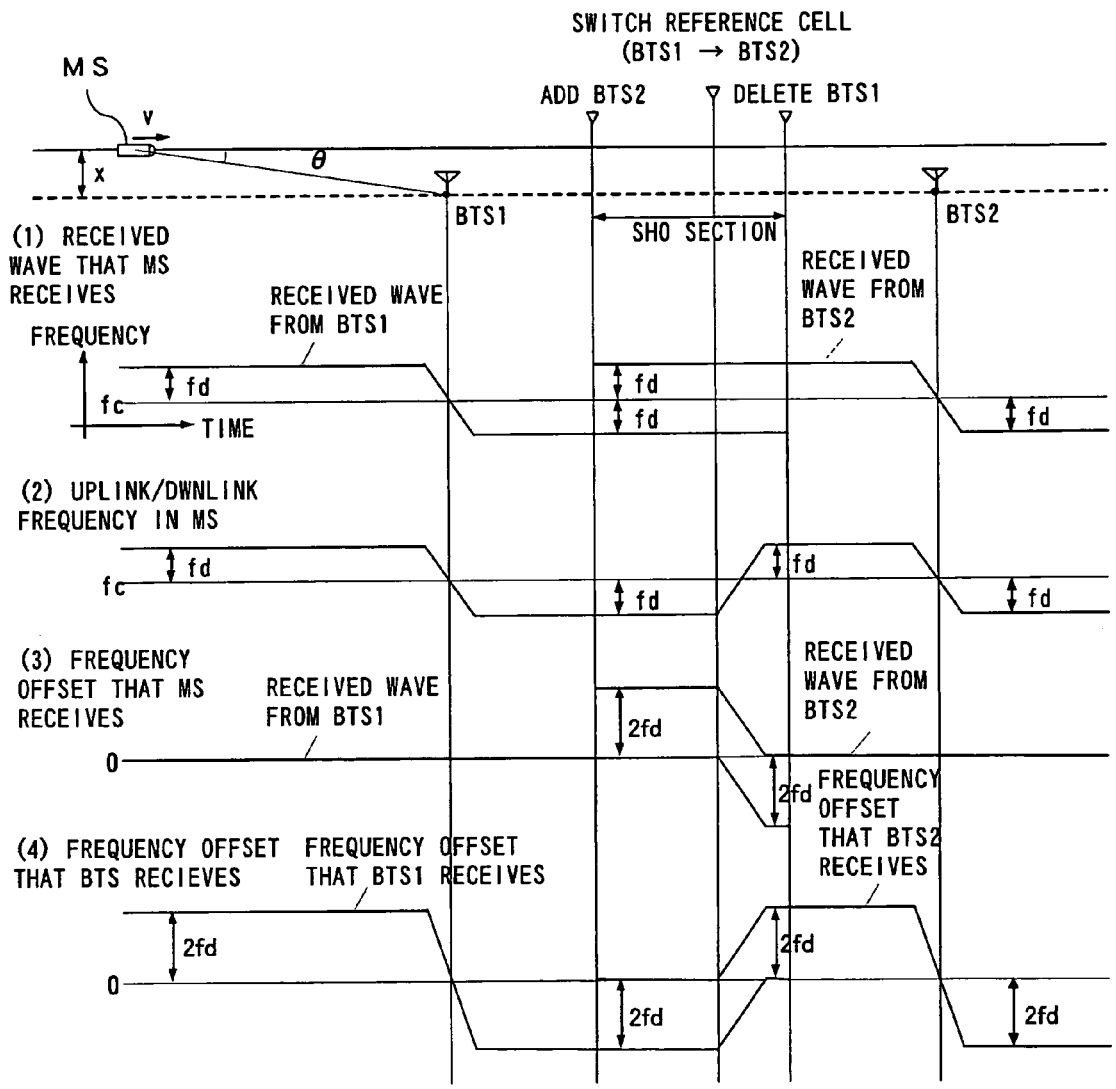
FIG. 2 is a diagram showing the frequency control in a conventional mobile communication system.
Figure 3:
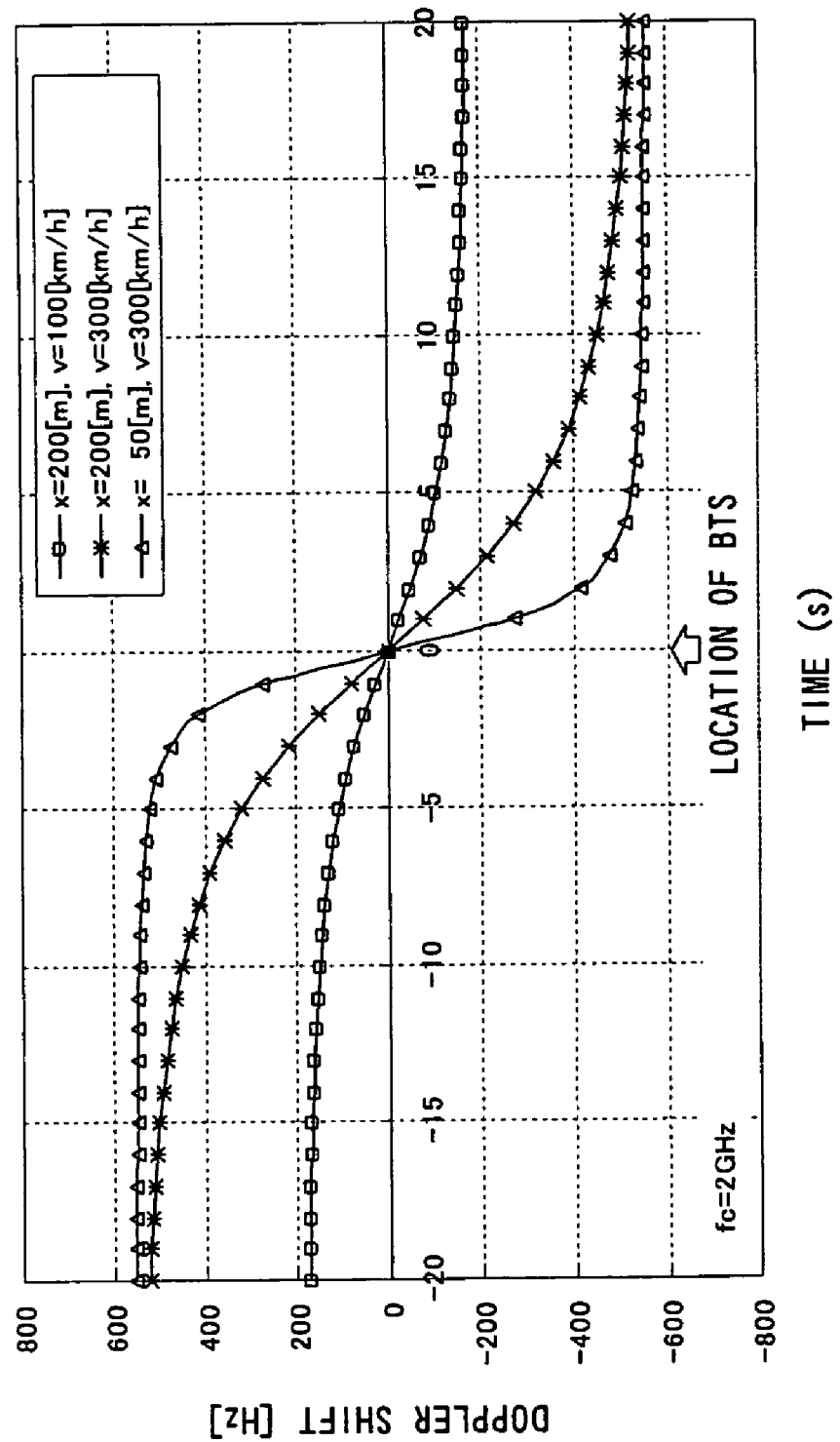
FIG. 3 is diagram showing fluctuation in the Doppler shift.

As described above, in the first embodiment, the frequency control of the downlink signal is performed so that the frequency offset of the received wave from any of the base transceiver stations becomes zero in the mobile station. Therefore, the mobile station, in the soft handover, a plurality of received waves, in each of which the Doppler shift is substantially zero, can be synthesized, and therefore, the deterioration of the reception quality can be prevented. In the conventional art, as explained with reference to FIG. 2, the reception quality was deteriorated because a received wave with frequency shifted to positive side and a received wave with frequency shifted to negative side are synthesized in the handover section.

According to the above configuration, even in the soft handover in a high-speed moving environment, each of the base transceiver stations concerning the handover controls the transmission frequency so as to cancel the Doppler shift for the target mobile station, the mobile station does not synthesize the received waves with different Doppler shift polarities as in the conventional example, and therefore, deterioration of the reception quality can be avoided.

FIG. 8 is a flowchart showing an operation of the phase rotator 1. Processing in the flowchart is periodically repeatedly, for example.

In step S1, whether or not the communication is performed in the dedicated channel is examined. If not in the dedicated channel, the processing is terminated without the frequency control. In step S2, whether it is in the handover state or not is examined. If not in the handover state, in step S3, whether or not "$\tau$" has elapsed from the start of the frequency control is examined. Here, the frequency control is started upon the call request from the mobile station, for example. "$\tau$" is, as explained above, equivalent to the convergence time of the AFC in the mobile station. When "$\tau$" has not elapsed from the start of the frequency control, the phase rotation equivalent to the "$-\Delta f_0/2$" is added to the downlink signal in the base band region in step S4. Here, "$\Delta f_0$" is frequency offset detected in the state that the frequency control is not performed, and is equivalent to twofold of the Doppler shift. Meanwhile, after "$\tau$" has elapsed from the start of the frequency control, a phase rotation equivalent to "$-\Delta f(t)$" is added to the downlink signal in the base band region in step S5. Here, "$-\Delta f(t)$" is frequency offset detected after the AFC converged in the mobile station, and is a value changing dynamically. When the mobile station to be examined is in the handover state, step S5 is performed.

As described above, in the first embodiment, it is possible to make the frequency offset zero in the mobile station. The frequency offset in the base transceiver station becomes half compared with that of the conventional system. In addition, a plurality of received waves without frequency offset can be synthesized in handover section. Therefore, the reception quality can be improved both in the base transceiver station and the mobile station (especially in the mobile station).

In the above system, the base transceiver station apparatus 100 may add a phase rotation equivalent to twofold of the Doppler shift to the transmission symbol. In such a case, while the mobile station approaches to the base transceiver station, the transmission frequency of the base transceiver station becomes "fc-2fd", and the reception frequency of the mobile station becomes "fc-fd". Then, the transmission frequency of the mobile station becomes "fc-fd" under the AFC. Consequently, the reception frequency of the base transceiver station becomes "fc". Such a phase rotation (i.e. frequency control) is performed in the base transceiver station, frequency offset equivalent to the Doppler shift remains in the mobile station; however, the frequency offset can be zero in the base transceiver.

Second Embodiment

Figure 9:
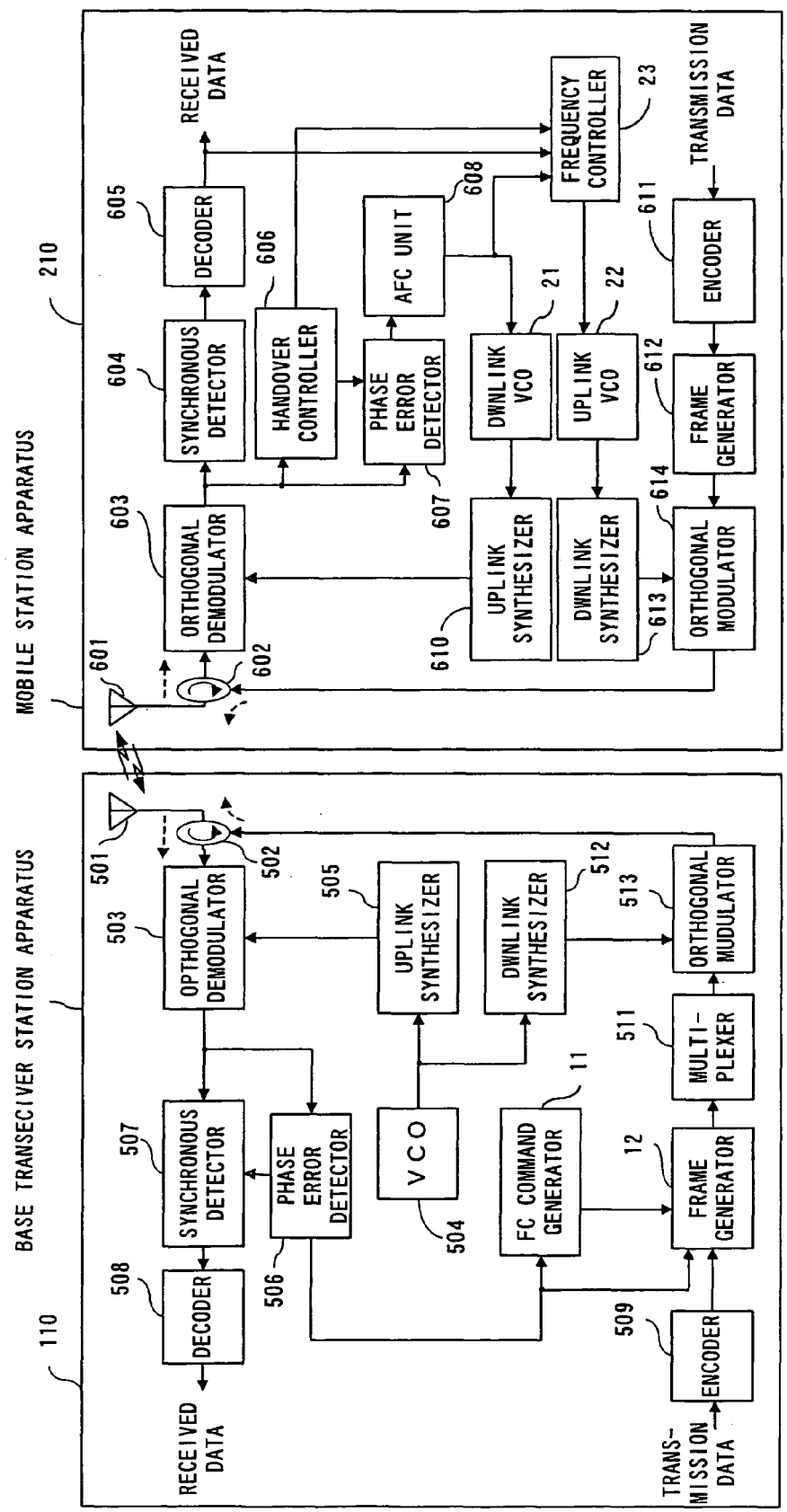
FIG. 9 is a diagram describing a configuration of the mobile communication system of the second embodiment.

FIG. 9 is a diagram showing a configuration of the mobile communication system of the second embodiment. Compared with the conventional base transceiver station apparatus 500 shown in FIG. 1, a frequency control (FC) command generator 11 is provided in a base transceiver station apparatus 110 shown in FIG. 9. A frame generator 12 comprises a function for writing in a frequency control command generated by the FC command generator 11 in a prescribed region, in addition to functions comprised in the frame generator 510 shown in FIG. 1.

Figure 1:
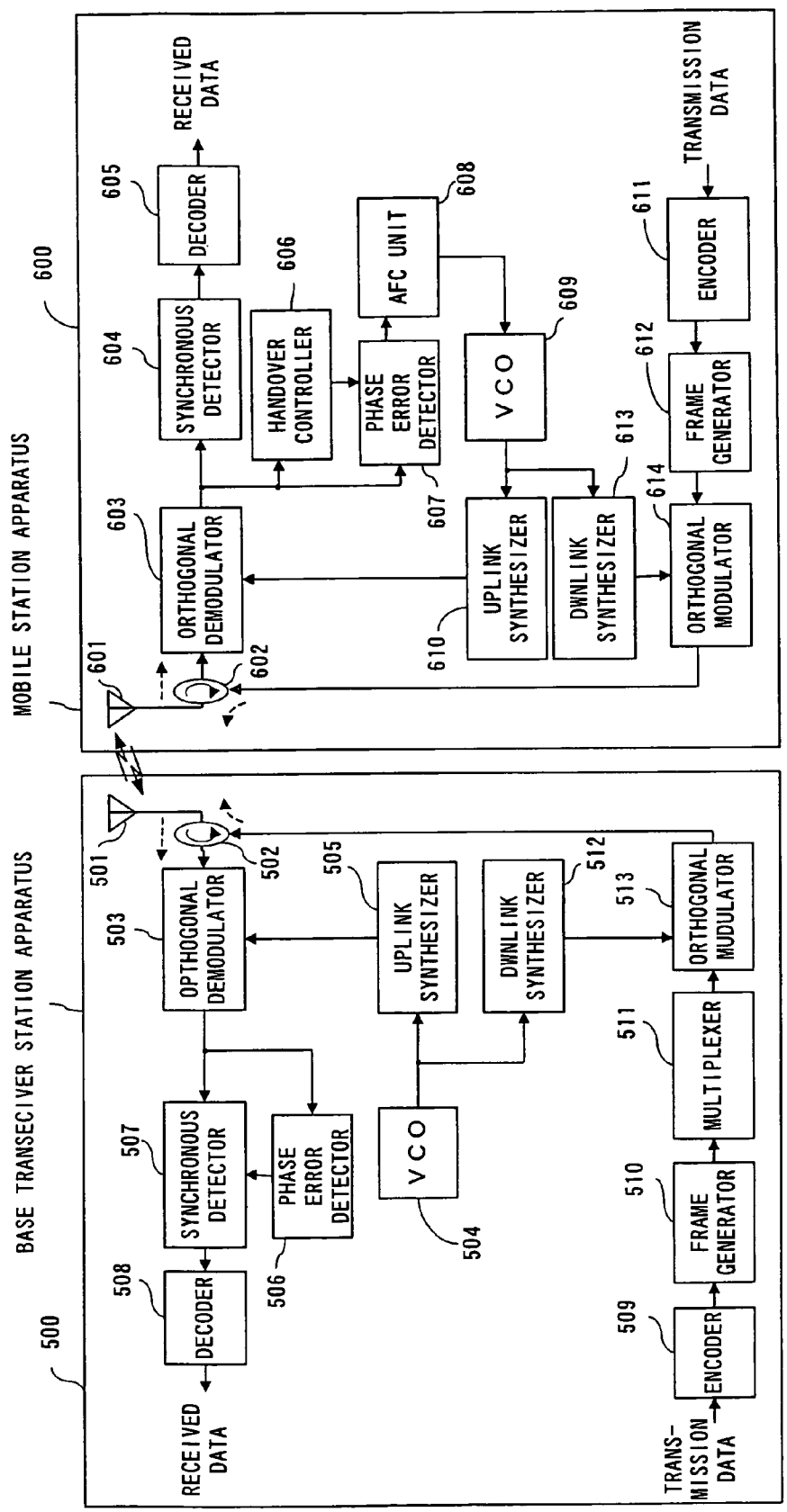
FIG. 1 is a diagram describing a configuration of a conventional mobile communication system.

A mobile station apparatus 210, in addition to the conventional configuration shown in FIG. 1, comprises a downlink VCO 21, an uplink VCO 22, and a frequency controller 23 for controlling the uplink VCO 22 in accordance with the frequency command transmitted from the base transceiver station. During reception of the frequency command, the frequency of the uplink VCO 22 is controlled independently of the downlink VCO 21. The downlink VCO 21 is basically the same as the VCO 609 shown in FIG. 4.

First, an explanation of the frequency control command (hereinafter referred to as FC command) is provided. The frequency control command generator 11 comprised in the base transceiver station apparatus 110 generates an FC command to be transmitted to the corresponding mobile station based on the frequency offset of each mobile station detected by the phase error detector 506. The FC command is a control signal for canceling the frequency offset in the received wave in the base transceiver station, and is generated as described below.

1. A binary signal (1-bit information) only instructing increase/decrease of the frequency Based on the sign of the frequency offset $\Delta f$ detected by the phase error detector 506, the FC command is generated as below.
(1) When $\Delta f<0$: FC command=0 (mobile station increases the transmission frequency by "a (Hz)")
(2) When $\Delta f\geq 0$: FC command=1 (mobile station decreases the transmission frequency by "a (Hz)")
The frequency control step "a" is a fixed value determined in advance.

2. A multi-valued signal comprising a signal for instructing increase/decrease of the frequency and for instructing control step of the frequency The amount of $\Delta f$ detected by the phase error detector 506 is determined using prepared thresholds, and a FC command presenting the determination result is generated.
(1) When $\Delta f\leq -f3$: FC command=+3 (mobile station increases the transmission frequency by "3b(Hz)")
(2) When $-f3<\Delta f\leq -f2$: FC command=+2 (mobile station increases the transmission frequency by "2b(Hz)")
(3) When $-f2<\Delta f\leq -f1$: FC command=+1 (mobile station increases the transmission frequency by "b (Hz)")
(4) When $-f1<\Delta f \leq f1$: FC command=0 (mobile station does not change the transmission frequency)
(5) When $f1\leq \Delta f<f2$: FC command=-1 (mobile station decreases the transmission frequency by "b(Hz)")
(6) When $f2\leq \Delta f<f3$: FC command=-2 (mobile station decreases the transmission frequency by "2b(Hz)")
(7) When $f3\leq \Delta f$: FC command=-3 (mobile station decreases that transmission frequency by "3b(Hz)")
The threshold f1 through the threshold f3 and the frequency control step "b" are fixed values determined in advance, respectively.

3. A multi-valued signal comprising a quantized value of the frequency offset detected by the phase error detector 506 and its sign
(1) When $\Delta f<0$: the mobile station increases the transmission frequency by "$\Delta f$(Hz)"
(2) When $\Delta f\geq 0$: the mobiles station decreases the transmission frequency by "$\Delta f$(Hz)"

Comparison among the above three command forms, the convergence time in the frequency control in the mobile station is the longest in the form 1, and is the shortest in the form 3. On the other hand, overhead due to the FC command in the downlink is the smallest in the form 1, and is the largest in the form 3. In other words, the convergence time and the overhead are in a trade-off relation to each other. Therefore, it is desirable that the selection of the FC command form is made properly in accordance with the upper limit of the moving speed predicted by the system and the carrier frequency that propagates the signal.

Figure 10:
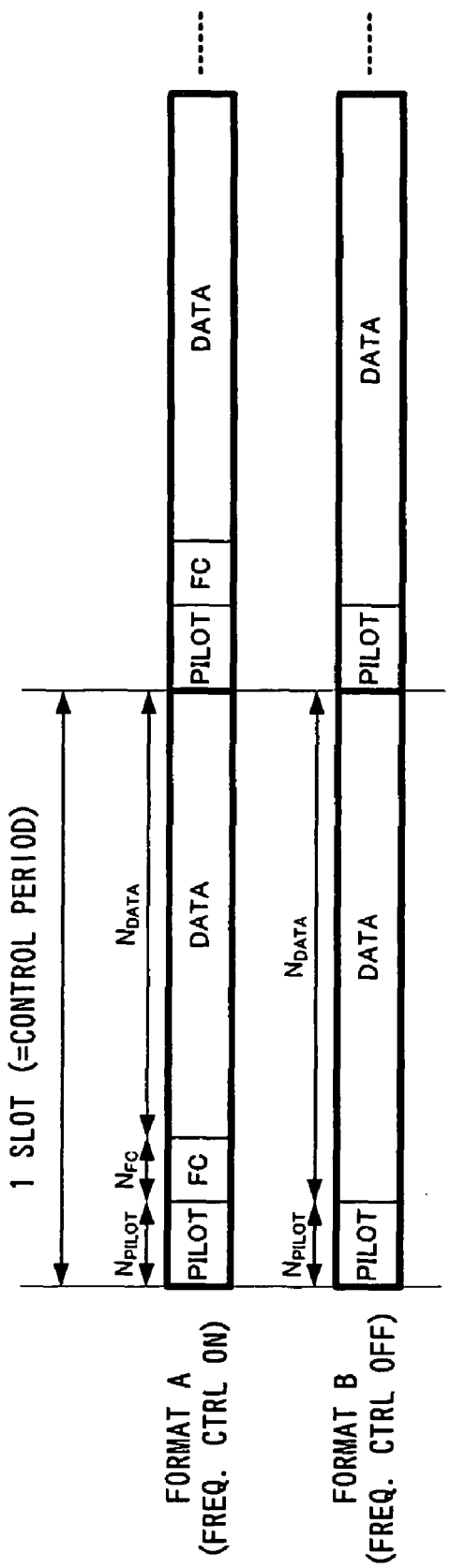
FIG. 10 is a diagram showing a format of a slot for transmitting a frequency control command.

The FC command generated in the above manner is time-multiplexed to a prescribed region in a slot of a format A shown in FIG. 10 by the frame generator 12, and then, it is transmitted to the corresponding mobile station. The slot is the smallest unit of the transmission format, and the slot time is equivalent to a repetition period of the frequency control.

In FIG. 10, "$N_{PILOT}$" is number of bits of the pilot signal. "$N_{FC}$" is number of bits of the FC command. "$N_{DATA}$" is number of bits of the encoded data. This format is the same in the third through the seventh embodiments explained later.

FIG. 11 is a flowchart showing an operation of the frame generator 12. The processing is repeatedly performed in a prescribed time period. In step S11, whether or not the absolute value of the detected frequency offset is equal to or larger than the threshold $\alpha$ is examined. If the absolute value of the detected frequency offset is equal to or larger than the threshold $\alpha$, a protection stage counter is incremented in step S12. If not, the protection stage counter is reset in step S13. In step S14, whether or not the count value of the protection stage counter is equal to or larger than the threshold $\beta$ is examined. If the count value of the protection stage counter is equal to or larger than the threshold $\beta$, in step S15, the format A shown in FIG. 10 is selected. If not, in step S16, a format B shown in FIG. 10 is selected. The processing in this flowchart may be performed in the third through the seventh embodiments explained later.

As described above, when the state that frequency offset is larger than the prescribed threshold continues longer than a predetermined time period, the format A including the FC command is selected and the frequency control becomes valid. On the other hand, during the time period other than the above state, the format B without the FC command is selected, and the frequency control becomes invalid. The type information indicating the selected format is multiplexed to the control signal and is notified to the mobile station. By so doing, the mobile station can recognize whether the frequency control is valid or invalid.

According to the above method, it is possible to validate the frequency control only under the environment where the frequency compensation for the Doppler shift is required. Therefore, in a whole system, power consumption involving the feedback transmission of the frequency control signal and interference noise to the other stations can be kept to a minimum by a statistical multiplexing.

The same function can be realized using the format A shown in FIG. 10 alone rather than using two types of formats as in above. For example, when the absolute value of the frequency offset continuously exceeds the threshold $\alpha$, the FC command is transmitted with a prescribed power, and in other cases, DTX transmission (transmission power is made zero ($=-\infty$[dBm])) is performed at the timing when the FC command is to be transmitted. In such a case, the mobile station can recognize whether the frequency control is valid or invalid by monitoring the reception level of the FC command, and therefore, the control information for format identification is not needed.

The environment where the frequency control is required can be specified to a certain extent in a setting condition of the base transceiver station (such as alongside of a highway or a railway, and presence/absence of an obstacle). Therefore, instead of the dynamically determining whether the frequency control is needed, the format selection or valid/invalid control using the DTX transmission can be performed according to the setting condition of the base transceiver station. Specifically, for example, a method in which valid/invalid of the frequency control is set as a control parameter unique to the base transceiver station in advance is possible.

Next, an operation of the mobile station apparatus 210 is explained. The mobile station apparatus 210 obtains the above FC command by decoding the received signal in the decoder 605. The FC command is transmitted to the frequency controller 23. The frequency controller 23 calculates a frequency to be generated by adding the frequency instructed by the FC command to the current uplink frequency. For example, when the current uplink frequency is "fcc (Hz)", if the FC command received from the base transceiver station indicates "+a(Hz)", "fcc+a(Hz)" is obtained. In the same manner, when the FC command indicates "−a (Hz)", "fcc−a (Hz)" is obtained. The frequency controller 23 generates control voltage corresponding to the calculated frequency and inputs it to the uplink VCO 22.

In the configuration of the second embodiment, a method to control the downlink frequency is the same as the conventional ones, and the FC command is used only for the control of the uplink frequency. However, control voltage from the AFC unit 608 is also input to the frequency controller 23. When the frequency control by the FC command is invalidated, the frequency controller 23 controls the uplink VCO 22 using the control voltage from the AFC unit 608. In such a case, like the conventional art, the uplink frequency and the downlink frequency become equal to each other.

When the mobile station apparatus 210 is in the handover state, and the FC commands are received from a plurality of base transceiver stations, the control voltage to be input to the uplink VCO 22 is generated by either one of the following methods. Assume that the handover controller 606 monitors the quality of the received signal from each surrounding base transceiver station.

1. The FC command from the base transceiver station with the best reception quality is selected, and the control voltage is generated in accordance with the selected FC command alone
2. FC commands received from a plurality of base transceiver stations are combined using each reception quality as a weight, and the control voltage is generated in accordance with the calculation result. For example, in a case where the received SIR is used for the weighted-combination, when the received SIR of the signal from a base transceiver station i is "$SIR_i$", and the amount of frequency control by the FC command from the base transceiver station i is "$FC_i$", the combined amount of frequency control $C_{comb}$ is calculated by the following equation.

$$FC_{comb} = \sum_i (SIR_i \times FC_i) \Big/ \sum_i SIR_i$$

Figure 12:
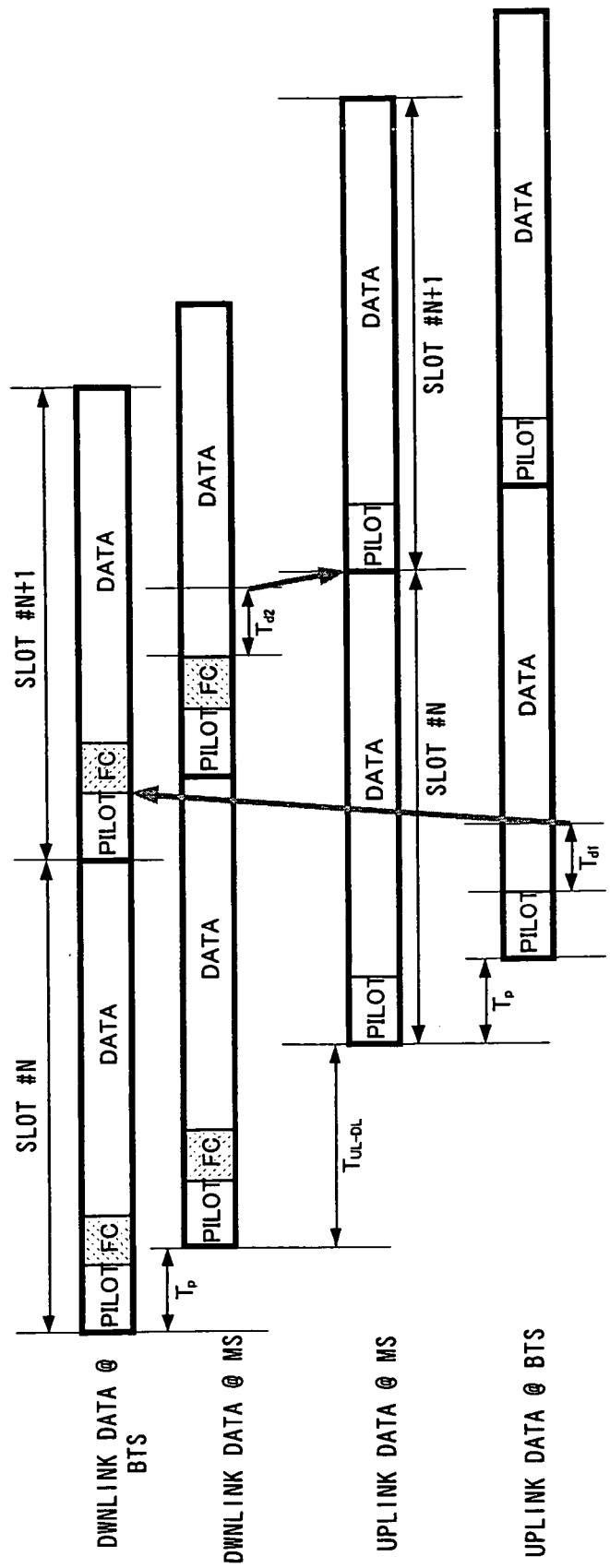
FIG. 12 is a diagram explaining a sequence of the frequency control.

FIG. 12 is a diagram explaining a sequence of the frequency control. The sequence is performed in the third through the seventh embodiment explained later.

First, downlink data of slot #N is transmitted from the base transceiver station to the mobile station. The downlink data is received by the mobile station at timing delayed by the propagation delay ($=T_p$) of the downlink propagation path from the transmission timing of the base transceiver station. The mobile station transmits the uplink data of slot #N at a timing delayed by a prescribed system-specific time ($=T_{UL\text{-}DL}$) from the reception timing of the downlink data. The base transceiver station receives the uplink data of slot #N at timing delayed by propagation delay ($=T_p$) of the uplink propagation path from the transmission timing of the mobile station. Then, the phase error detector 506 in the base transceiver station calculates the frequency offset of the received wave by the time correlation of the pilot signal included in the uplink data of slot #N. The FC command generator 11 generates the FC command by either one of the above methods based on the calculated frequency offset. At that time, processing time $T_{d1}$ occurs from the reception of the pilot signal to generation of the FC command. The generated FC command is inserted into a prescribed position of the downlink data of slot #N+1 by the frame generator 12, and is transmitted to the mobile station.

Next, the mobile station receives the downlink data of slot #N+1 at timing delayed by the propagation delay ($=T_p$). The decoder 605 decodes the FC command from the received slot. It takes time $T_{d2}$ for this decoding processing. The decoded FC command is converted into control voltage for controlling an oscillation frequency of the uplink VCO 22 in the frequency controller 23. Therefore, the mobile station transmits slot #N+1 with a frequency controlled in accordance with the FC command. Subsequently, by repeating the above frequency control in a slot period, in the mobile station, it is possible to control the uplink frequency independently of the downlink frequency.

Figure 13:
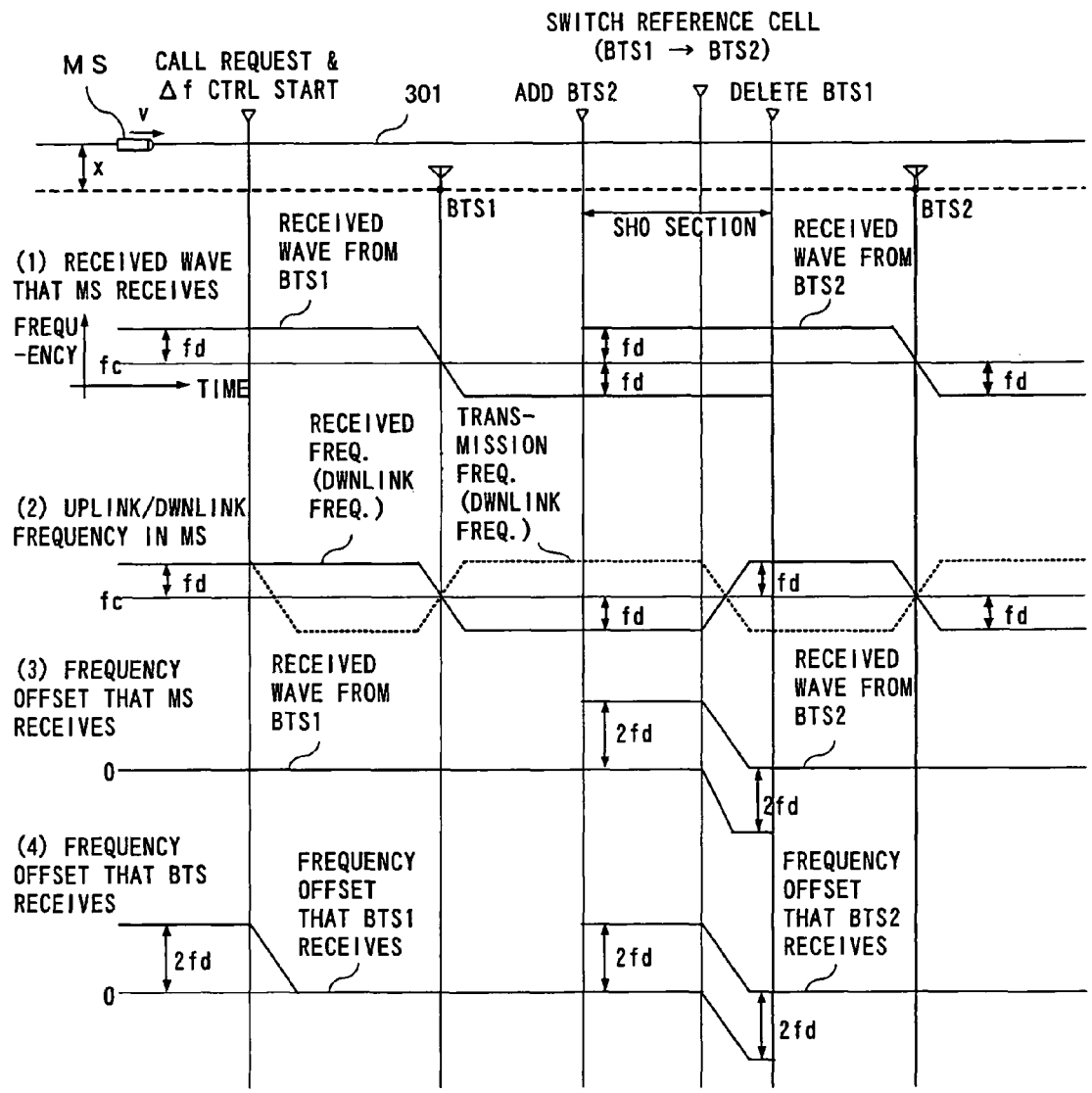
FIG. 13 is a diagram (1) explaining the frequency control in the mobile communication system of the second embodiment.

FIG. 13 and FIG. 14 are diagrams explaining the frequency control in the mobile communication system of the second embodiment. The controls shown in FIG. 13 and FIG. 14 are different from each other in the handover section.

A relative positions of a mobile station (MS) and base transceiver stations (BTS1 and BTS2) and a propagation environment between the mobile station and the base transceiver stations are the same as explained with reference to FIG. 7. The mobile station performs the AFC on the received wave via the common channel from the base transceiver station (BTS1) prior to the start of the call request of dedicated channel. When the call request from the mobile station is issued, the frequency of the received wave of the base transceiver station (BTS1) is "fc+2fd". In other words, the frequency offset $\Delta f_0$ detected by the base transceiver station (BTS1) is equivalent to twofold of the Doppler shift.

Upon detecting the call request from the mobile station, the base transceiver station (BTS1) starts control of the uplink frequency using the FC command. At that time, the FC command instructs the control of the transmission frequency to the mobile station so that the frequency offset at the base transceiver station (BTS1) becomes zero. By the FC command, the transmission frequency of the mobile station converges on "fc−fd". As a result, the frequency of the received wave of the base transceiver station apparatus (BTS1) becomes "fc". In other words, the frequency offset of the base transceiver station (BTS1) becomes zero. However, the frequency control is not performed on the downlink. Therefore, the frequency of the received wave of the mobile station becomes "fc+fd". In other words, the frequency offset to be compensated for in the mobile station is "fd" as in the conventional art shown in FIG. 2.

When the mobile station passes near the base transceiver station (BTS1), a feedback control on the uplink frequency is performed so that the frequency offset in the base transceiver station 1 (BTS1) is locked at zero. Thus the transmission frequency of the mobile station shifts from "fc−fd" to "fc+fd" while keeping up with the polarity change in the Doppler shift.

When the mobile station recedes from the base transceiver station (BTS1) and approaches to the base transceiver station (BTS2), both base transceiver stations are in the soft handover state. The controls of the handover state are different from one another in FIG. 13 and FIG. 14.

In an example shown in FIG. 13, while the reference cell is the base transceiver station (BTS1), the mobile station performs the AFC based on only the FC command from the base transceiver station (BTS1). Therefore, the transmission frequency of the mobile station is maintained at "fc+fd", and the frequency offset in the base transceiver station (BTS1) remains zero. However, during this period, the frequency offset in the base transceiver station (BTS2) is "2fd". At that time, the quality of the received signal from the base transceiver station (BTS1) is high, however the quality of the received signal from the base transceiver station (BTS2) is low. Consequently, in the present embodiment, the mobile station may regenerate data by using only a signal from the base transceiver station (BTS1) rather than by combining signals from the base transceiver station (BTS1) and the base transceiver station (BTS2).

When the reference cell is switched from the base transceiver station (BTS1) to the base transceiver station (BTS2), the mobile station performs the AFC based on the FC command from the base transceiver station (BTS2). Therefore the transmission frequency of the mobile station shifts from "fc+fd" to "fc−fd" at a speed according to the time constant of the feedback control. As a result, the frequency offset in the base transceiver station (BTS2) becomes zero; however, the frequency offset in the base transceiver station (BTS1) becomes "2fd".

In an example shown in FIG. 14, in the handover section, the FC commands from the base transceiver station (BTS1) and the base transceiver station (BTS2) are combined using the reception quality as weight. Then, the transmission frequency of the mobile station slowly shifts from "fc+fd" to "fc−fd". By lowering the frequency offset in the base transceiver station apparatus (BTS1) which recedes from the mobile station in advance before switch of the reference cell, the frequency offset in the base transceiver station apparatus (BTS2) which approaches to the mobile station can be kept smaller than "2fd". Consequently, the frequency offset is favorably distributed to the base transceiver stations which relates to the handover.

Under the control shown in FIG. 13, the load on the frequency controller 23 in the mobile station is reduced. On the other hand, under the control shown in FIG. 14, uplink frequency shifts smoothly before and after the switch of the reference cell, and therefore, the reception quality in each base transceiver station and the mobile station is enhanced during the handover period.

Third Embodiment

Figure 15:
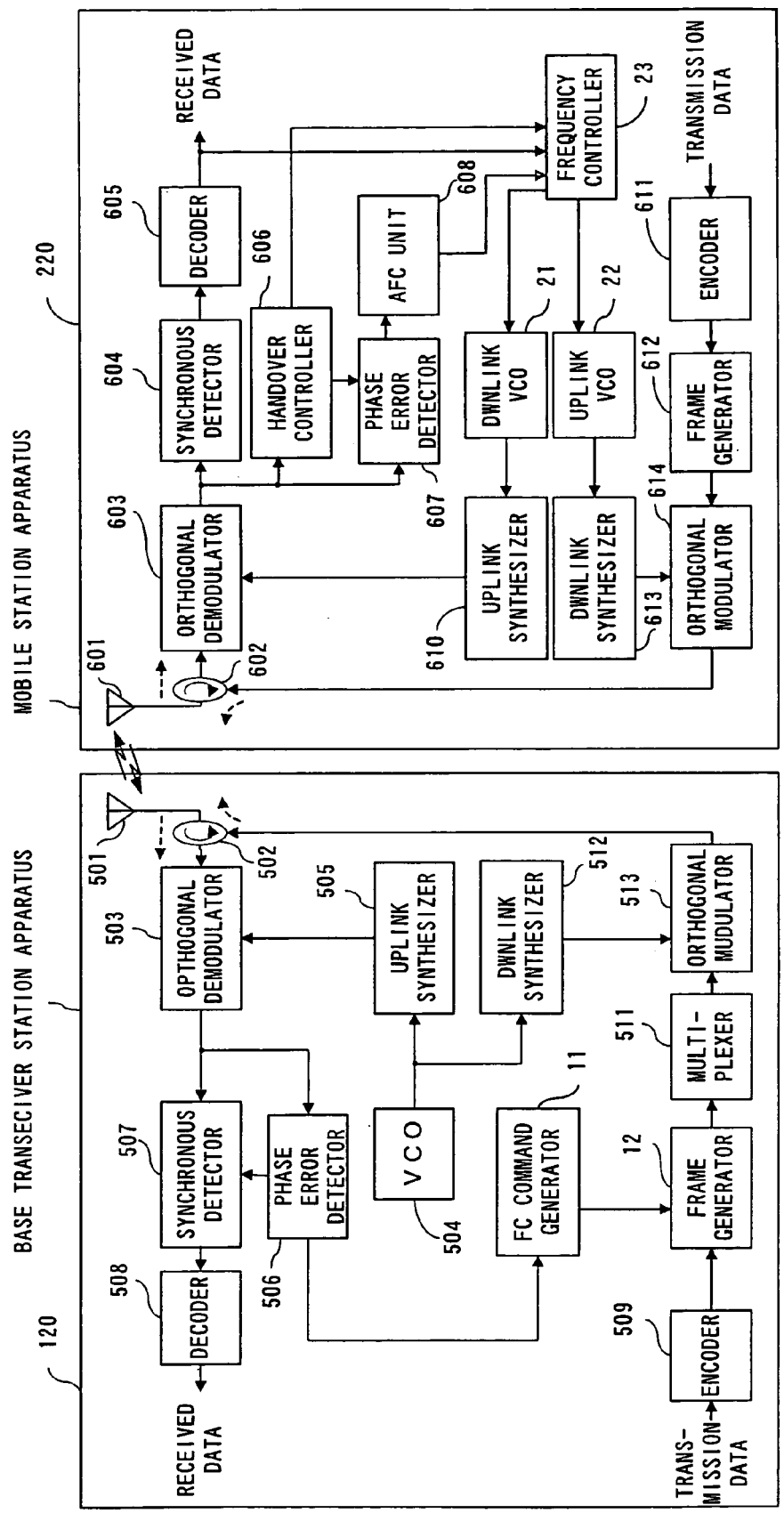
FIG. 15 is a diagram showing a configuration of the mobile communication system of the third embodiment.

FIG. 15 is a diagram showing a configuration of the mobile communication system of the third embodiment. The base transceiver station apparatus 120 and the mobile station apparatus 220 shown in FIG. 15 are basically the same as the base transceiver station apparatus 110 and the mobile station apparatus 210 of the second embodiment. However, in the base transceiver station apparatus 120 of the third embodiment, it is not necessary to transmit the detection result by the phase error detector 506 to the frame generator 12. In the mobile station apparatus 220 of the third embodiment, the downlink VCO 21 for generating the periodic wave for down-converting the downlink signal is controlled by the control voltage generated by the frequency controller 23.

In the system with the above configuration, the FC command generator 11 generates the FC command in which the frequency control ON/OFF bit (for example 0:OFF and 1:ON) is added to the highest-order bit (or Most Significant Bit) in a command generated in the second embodiment. Here, "the command generated in the second embodiment" can be any one of the above three types of commands. The frequency control ON/OFF bit is, like the valid/invalid determination of the frequency control in the second embodiment, generated based on the comparison between the frequency offset detected by the phase error detector 506 and the threshold, or the setting conditions of the base transceiver station. The frame generator 12 inserts the above FC command into the format A shown in FIG. 10 regardless of the validity/invalidity of the frequency control, and transmits with a prescribed power.

Figure 16:
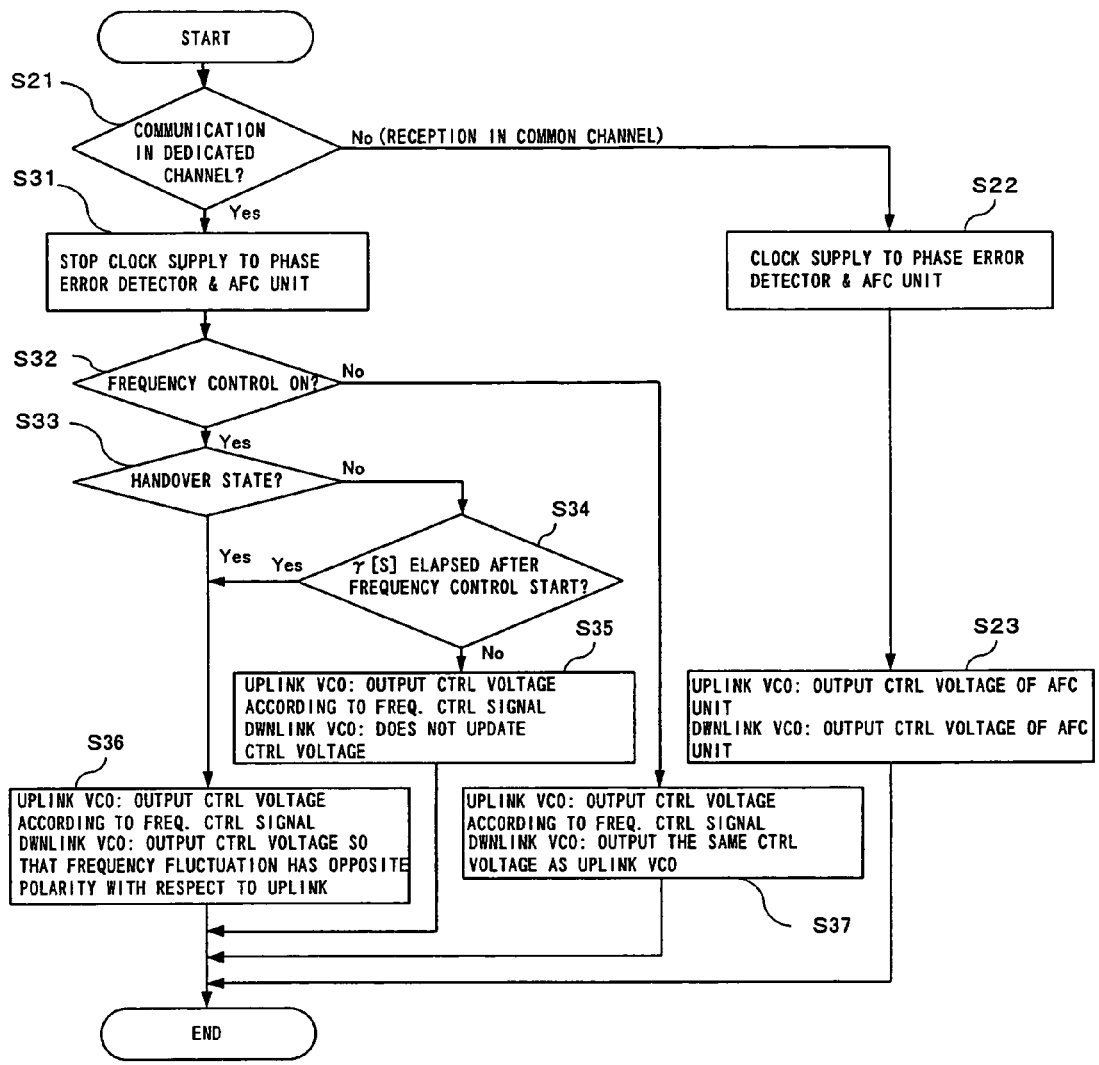
FIG. 16 is a flowchart showing an operation of the frequency control unit of the third embodiment.

The frequency controller 23 in the mobile station apparatus 220, upon receiving the FC command, generates the control voltage to be provided to the downlink VCO 21 and the uplink VCO 22 in accordance with the flowchart shown in FIG. 16.

In FIG. 16, in step S21, whether or not the communication is performed in the dedicated channel is examined. If the communication is performed in the dedicated channel, the processing proceeds to step S31, and otherwise, the processing proceeds to step S22. Assume that the mobile station receives the control signal from the base transceiver station via the common channel when the communication is not performed in dedicated channel.

1. During Communication in the Common Channel (Steps S22-S23)

The mobile station, while receiving the control signal from the base transceiver station via the common channel, basically does not receive the FC command. Therefore, in such a case, the frequency controller 23 provides the control voltage generated by the AFC unit 608 to the downlink VCO 21 and the uplink VCO 22.

2. During Communication in the Dedicated Channel (Steps S31-S37)

After the mobile station issues a call request and the communication in the dedicated channel is started, the frequency control function by the AFC can be substituted by a control using the FC command, and therefore, the clock supplies to the phase error detector 607 and the AFC unit 608 are stopped. By so doing, it is possible to reduce the power consumption of the redundant block.

The frequency control ON/Off is identified by the highest-order bit of the received FC command. When the frequency control is performed, the uplink frequency and the downlink frequency different from each other are generated. Meanwhile, when the frequency control is not performed, the uplink frequency and the downlink frequency become the same.

2a. When the Frequency Control is ON (Steps S33-S36)

When performing the frequency control, according to the frequency control information in the FC command, the control voltage for the uplink VCO 22 is generated. The generation of the control voltage is the same as in the second embodiment. That is to say, when the mobile station approaches to the base transceiver station, the uplink VCO 22 is controlled so that the transmission frequency becomes "fc−fd". When the mobile station recedes from the base transceiver station, the uplink VCO 22 is controlled so that the transmission frequency becomes "fc+fd". AT that time, the reception frequency can be obtained by adding the Doppler shift frequency fd with opposite polarity from the transmission frequency to the reference frequency fc. In other words, when the mobile station approaches to the base transceiver station, the downlink VCO 21 is controlled so that the reception frequency becomes "fc+fd". When the mobile station recedes from the base transceiver station, the downlink VCO 21 is controlled so that the reception frequency becomes "fc−fd".

According to the above frequency control, the uplink frequency and the down link frequency shown in FIG. 13 and FIG. 14 are obtained, and therefore, in a high-speed moving environment under the line of sight condition, the frequency offset in both base transceiver station and the mobile station become zero. According to this configuration, the AFC is not necessary, and thus, both high-speed and wide-band frequency control can be realized to the downlink frequency in addition to the uplink frequency. Furthermore, a complex variable control circuit described in the Patent Document 1 is not required.

During the time period from the start of the frequency control of the base transceiver station caused by the call request from the mobile station to the convergence of the uplink frequency on an appropriate value, the downlink frequency control is not performed. Therefore, during the time period in which a prescribed time γ elapses from the start of the frequency control, the frequency controller 23 updates only the control voltage of the uplink VCO 22 in accordance with the FC command, and does not update the control voltage of the downlink VCO 22.

When receiving the FC command from a target base transceiver station of handover, monitoring of the prescribed time γ is not necessary, and the control voltage of both of the downlink VCO 21 and the uplink VCO 22 are updates as described above.

2b. When the Frequency Control is OFF (Step S37)

The frequency controller 23, in accordance with the frequency control information in the FC command, outputs the same control voltage value to both of the downlink VCO 21 and the uplink VCO 22. In such a case, the same operation as the AFC in the conventional system shown in FIG. 1 can be realized.

Fourth Embodiment

Figure 17:
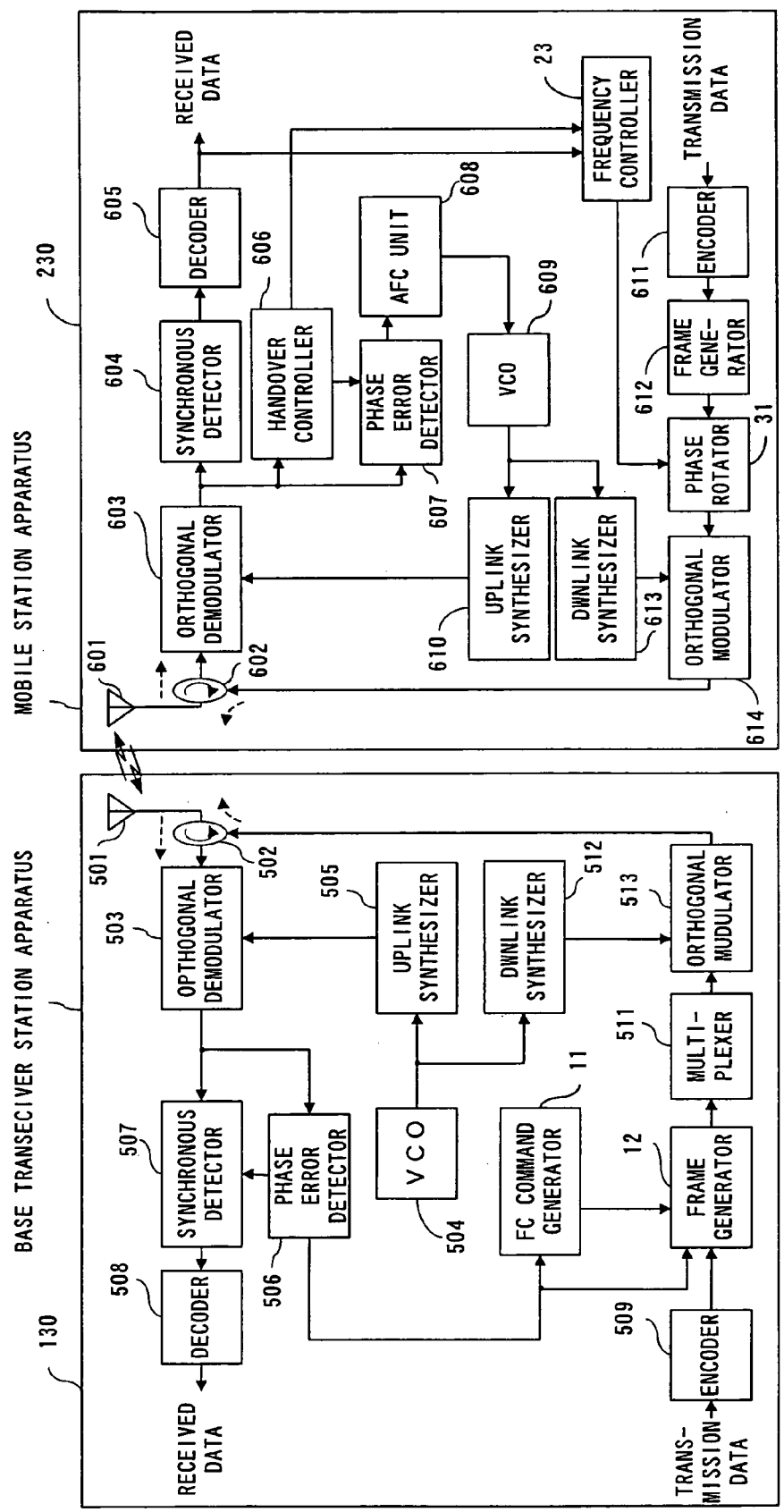
FIG. 17 is a diagram showing a configuration of the mobile communication system of the fourth embodiment.

FIG. 17 is a diagram showing a configuration of the mobile communication system of the fourth embodiment. The base transceiver station apparatus 130 and the mobile station apparatus 230 shown in FIG. 17 are basically the same as the base transceiver station apparatus 110 and the mobile station apparatus 210 in the second embodiment. However, in the mobile station apparatus 230 of the fourth embodiment, instead of the uplink VCO 21 and the downlink VCO 22, the VCO 609 controlled by the AFC unit 608 is comprised. A phase rotator 31 for rotating the phase of the transmission symbol in a base band region in accordance with the instruction from the frequency controller 23 is also comprised.

In the mobile station apparatus 230 with the above configuration, the frequency controller 23 converts a frequency updated by the FC command into the phase rotation θ, and provides the phase rotation θ to the phase rotator 31. The phase rotator 31 performs complex-multiplication of "exp (jθ)" to the uplink signal in the base band region. By so doing, the phase of the uplink signal in the base band region rotates by "θ".

By the above phase rotation, an effect equivalent to shifting the frequency spectrum of the uplink signal by a frequency equivalent to "θ" can be obtained. In other words, the frequency of the transmission wave output from the antenna element 601 of the mobile station is controlled equivalent to the operation shown in FIG. 13 or FIG. 14.

As described above, in the fourth embodiment, the control similar to the second embodiment can be realized without comprising VCOs to each of the uplink and downlink.

Fifth Embodiment

Figure 18:
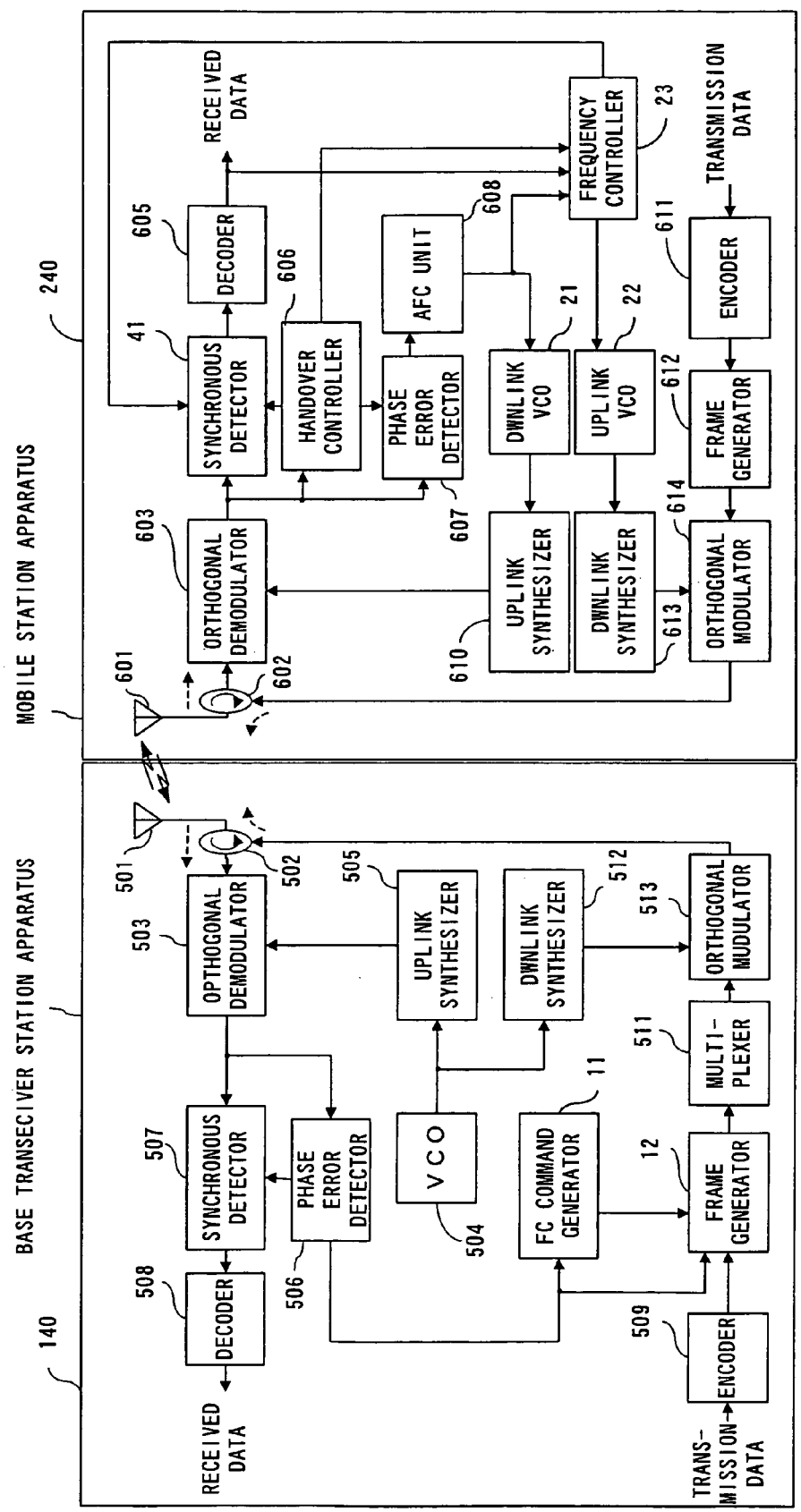
FIG. 18 is a diagram showing a configuration of the mobile communication system of the fifth through the seventh embodiment.

FIG. 18 is a diagram showing a configuration of the mobile communication system of the fifth embodiment. A base transceiver station apparatus 140 and a mobile station apparatus 240 are basically the same as the base transceiver station apparatus 110 and the mobile station apparatus 210 in the second embodiment. However, in the mobile station apparatus 240 of the fifth embodiment, a synchronous detector 41 comprised instead of the synchronous detector 604 performs detection operation regarding to the instruction from the handover controller 606 and the frequency controller 23.

Figure 19:
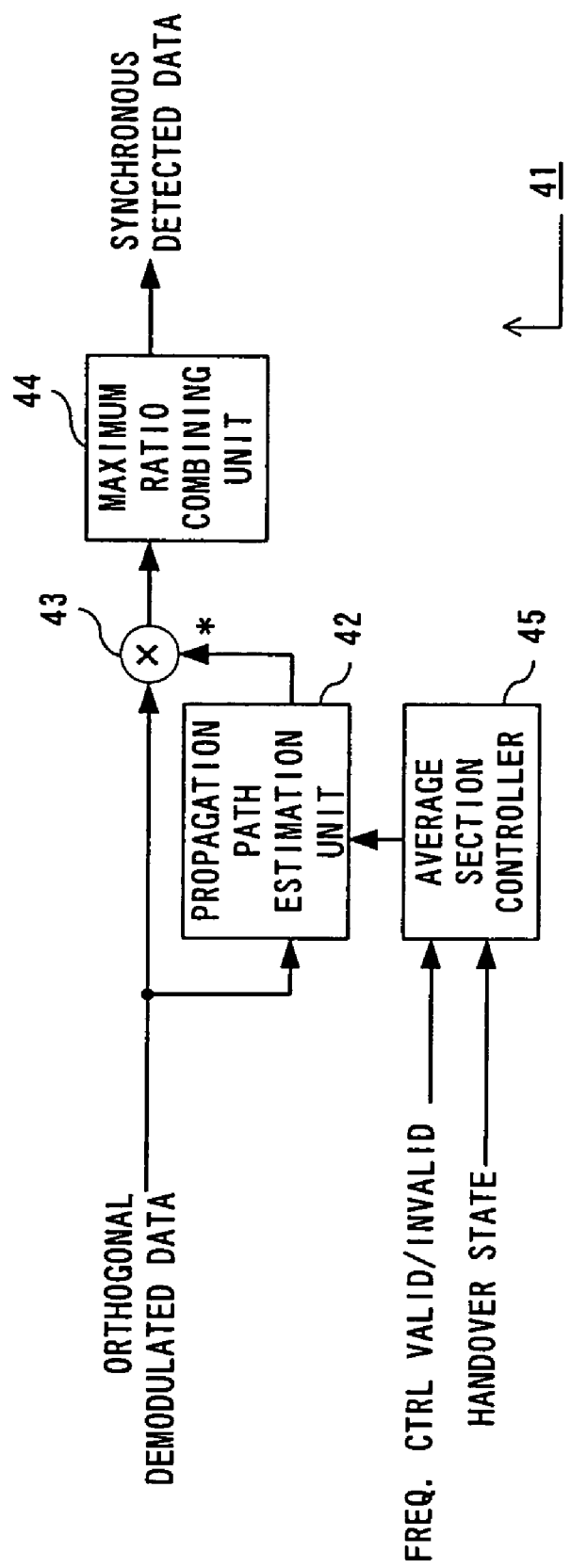
FIG. 19 is a diagram showing a configuration of the synchronous detector of the fifth embodiment.

FIG. 19 is a diagram showing a configuration of the synchronous detector of the fifth embodiment. As shown in FIG. 19, the synchronous detector 41 comprises a propagation path estimation unit 42, a complex-multiplier 43, a maximum ratio combining unit 44, and an average section controller 45.

The propagation path estimation unit 42 calculates a propagation path estimated value (an estimated value of the propagation path change) by taking in-phase adding and averaging of the pilot signal included in the orthogonal demodulated data of the downlink. The propagation path estimation unit 42 also, in the soft handover, calculates propagation path estimated value of each of the propagation paths between the mobile station and a plurality of base transceiver stations relating to the handover. The complex-multiplier 43 multiplies orthogonal demodulated data by a complex conjugate of corresponding propagation path estimated value. By so doing, synchronous detection is performed for each received signal. The maximum ratio combining unit 44 performs the maximum ratio combination for a plurality of synchronous detection results, and outputs ultimate synchronous detection data.

FIG. 20 is an example of the propagation path estimation unit 42 used in the fifth embodiment. In the propagation path estimation unit 42, the pilot signals stored in the head of each slot is periodically input. The propagation path estimation unit 42 calculates an average of consecutive N pilot signals. The result of this averaging is the propagation path estimation value (an estimated value of the phase fluctuation in the propagation path).

The above operation belongs to the conventional art. On the other hand, in the synchronous detector 41 of the fifth embodiment, the propagation path estimation unit 42 performs propagation path estimation in response to the instruction from the average section controller 45.

When the mobile station is in the handover state and the frequency control is valid for one or a plurality of base transceiver stations relating to the handover, the average section controller 45 gives the propagation path estimation unit 42 an instruction for reducing the additive averaging time compared with that of the normal condition. The propagation path estimation unit 42, which received this instruction, reduces the number of the pilot signals to be averaged. By so doing, the time constant of the propagation path estimation becomes short, and the response speed of the phase compensation operation can be enhanced. Whether or not the mobile station is in the handover state is determined by the handover controller 606. In addition, whether the frequency control is valid or invalid can be determined, for example, by information for identifying the format A/B shown in FIG. 10, or by whether the reception level of the FC command region exceeds the threshold or DTX.

In the handover, as shown in FIG. 13 and FIG. 14, the downlink data is received from both of the base transceiver station (BTS1) receding from the mobile station and the base transceiver station (BTS2) approaching to the mobile station. At that time, the reception frequency of a pair of the downlink signals received from the two base transceiver stations (BTS1 and BTS2) are different by "2fd". Therefore, for example, when the frequency control based on the above second embodiment is performed, the maximum ratio combination is performed on the pair of downlink received signals with frequencies deviated by "2fd", and therefore, the reception quality during the handover period may be deteriorated.

On the other hand, according to the fifth embodiment, when the soft handover is performed in the high-speed moving environment, the time constant of the propagation path estimation is controlled to be short, the phase compensation which can keep up with the phase rotation caused by the frequency offset is realized. Thus, it is possible to suppress the quality deterioration in the maximum ratio combination.

Sixth Embodiment

The configuration of the mobile communication system of the sixth embodiment is basically the same as that of the fifth embodiment shown in FIG. 18. However, in the fifth and the sixth embodiments, the operations of the synchronous detector 41 are different from each other.

Figure 21:
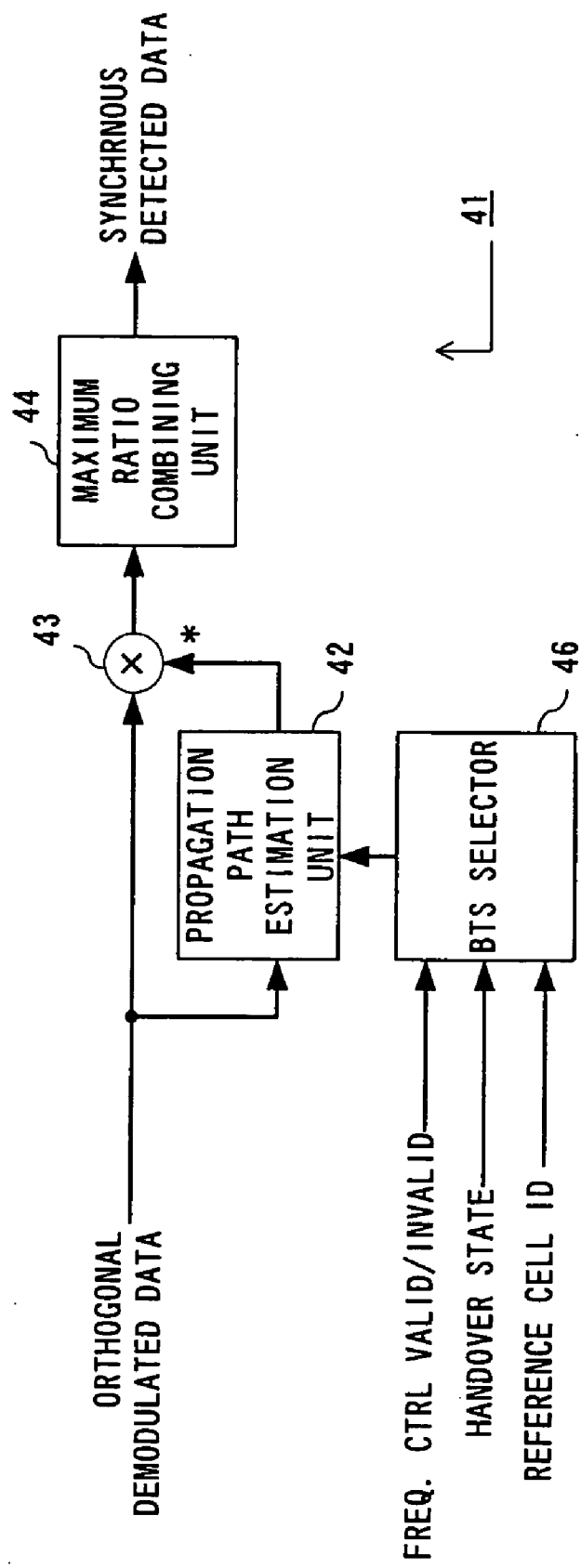
FIG. 21 is a diagram showing the configuration of the synchronous detector of the sixth embodiment.

FIG. 21 is a diagram showing the configuration of the synchronous detector of the sixth embodiment. The configuration of the synchronous detector of the sixth embodiment is basically the same as that of the fifth embodiment. However, the synchronous detector of the sixth embodiment comprises a base transceiver station selector 46 instead of the average section controller 45 of the fifth embodiment.

When the mobile station is in the handover state and the frequency control is valid in one or a plurality of the base transceiver stations relating to the handover, the base transceiver station selector 46 selects only the base transceiver station provided in the reference cell. On the other hand, during the period when the above conditions are not satisfied, the base transceiver station selector 46 selects all (or a part of) base transceiver stations relating to the handover. The reference cell is detected by the handover controller 606.

The propagation path estimation unit 42 performs the propagation path estimation and the maximum ratio combination only on the signal(s) received from the base transceiver station(s) selected by the base transceiver station selector 46. In other words, under the above handover environment, the synchronous detection is performed by using only the signal received from the base transceiver station in the reference cell.

In the conventional system, when the soft handover is performed under the high-speed moving environment, the maximum ratio combination is performed on the downlink signals with frequency difference "2fd". For that reason, under such environment, it is possible that the reception quality is further deteriorated by performing the maximum ratio combination. The sixth embodiment, however, in the soft handover under the high-speed moving environment, the synchronous detection is performed using only the signal from the base transceiver station in the reference cell with the highest reception quality, and thus, it is possible to avoid the deterioration of the reception quality caused by the maximum ratio combination.

Seventh Embodiment

The configuration of the mobile communication system of the seventh embodiment is basically the same as that of the fifth embodiment shown in FIG. 18. However, the operations of the synchronous detector 41 are different between the fifth and the seventh embodiments.

Figure 22:
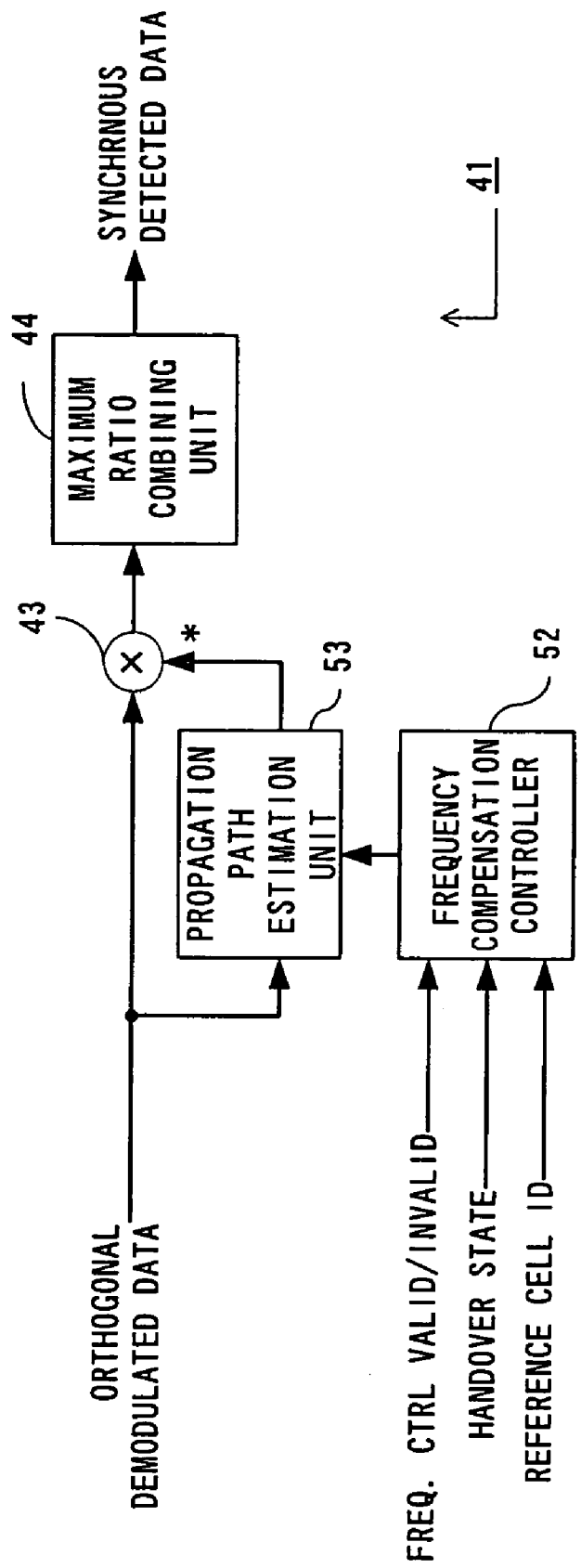
FIG. 22 is a diagram showing the configuration of the synchronous detector of the seventh embodiment.

FIG. 22 is a diagram showing the configuration of the synchronous detector of the seventh embodiment. The synchronous detector 41 of the seventh embodiment comprises a frequency compensation controller 52 and a propagation path estimation unit 53 instead of the average section controller 45 and the propagation path estimation unit 42.

The frequency compensation controller 52 performs the frequency offset compensation when the mobile station is in the handover state and the frequency control is valid in one or a plurality of the base transceiver stations relating to the handover, and does not perform the frequency offset compensation when the above conditions are not met.

When the frequency offset compensation is valid, the frequency compensation controller 52 notifies the propagation path estimation unit 53 of the frequency offset to be compensated for in the received wave from each base transceiver station relating to the handover. The "frequency offset to be compensated for" is calculated by the frequency controller 23 based on the FC command transmitted from each base transceiver station. The propagation path estimation unit 53 estimated the propagation path to each of the base transceiver stations, while compensating for the frequency offset notified from the frequency compensation controller 52.

FIG. 23 is an example of the propagation path estimation unit used in the seventh embodiment. The propagation path estimation unit 53, like the propagation path estimation unit 42 shown in FIG. 20, calculates in-phase additive averaging of the pilot signals. In the propagation path estimation unit 53, however, in order to compensate for the frequency offset, the input signal of the additive averaging circuit is multiplied by "exp(−jnθ)", and the output signal from the additive averaging circuit is multiplied by "exp(jmθ)". Here, "θ" is a phase rotation per one symbol, "n" is a symbol position of added pilot signal when the head symbol of the target slot is zero (n is an integer, which the future direction from the head of the target slot is a positive value), and "m" is a symbol position of the detected signal in the target slot (m=0 through M−1: M is number of symbols within one slot).

As described above, in the seventh embodiment, because the propagation path estimation is performed while compensating for the frequency offset, the estimation accuracy by the in-phase addition is improved. The synchronous detection is performed by using the result of adding the phase rotation for the amount of the frequency offset to the calculated propagation path estimation value, and therefore, it is possible to compensate for the phase fluctuation in the propagation path and the phase fluctuation caused by the frequency offset at the same time.

In the seventh embodiment, in the soft handover under high-speed moving environment, the synchronous detection is performed while compensating for the frequency offset remaining in each base transceiver station, and consequently, reception quality deterioration in the maximum ratio combination can be completely avoided.

As stated above, in the fifth through the seventh embodiments, synchronous detection operation in the mobile station is changed in the handover, a favorable demodulation processing can be performed even if the polarity of the Doppler shift of the received wave from one base transceiver station is different from the polarity of the Doppler shift of the received wave from another base transceiver station. Consequently, it is possible to improve the reception quality in the handover operation.

All of the fifth through the seventh embodiments improve the reception quality in soft handover under high-speed moving environment. The effect of the reception quality improvement is the most significant in the seventh embodiment, and the fifth embodiment stands the next, followed by the sixth embodiment. However, as the effect of the reception quality improvement becomes more significant, the processing of the synchronous detection becomes complicated. Therefore, which embodiments should be introduced should be determined according to the required reception quality level and the impact (the cost etc.) in implementation.

What is claimed is:

1. A base transceiver station apparatus for transmitting/receiving radio wave to/from a mobile station, comprising:
   a detector that detects a frequency offset (Δf) of a received wave from the mobile station; and
   a frequency controller that controls transmission frequency of a carrier wave for transmitting a signal to the mobile station so as to cancel a Doppler shift, which occurs in a radio link connecting to the mobile station, based on the frequency offset detected by said detector by controlling a downlink transmission frequency to approach $f_0-\Delta f/2$, where $f_0$ is a carrier wave frequency.

2. The base transceiver station apparatus according to claim 1, wherein said frequency controller controls the transmission frequency independently of a frequency control of a periodic wave for down-converting the received signal from the mobile station.

3. The base transceiver station apparatus according to claim 1, wherein said frequency controller controls the transmission frequency by giving a phase rotation corresponding to the frequency offset detected by said detector to a transmission symbol to the mobile station in a base band region.

4. The base transceiver station apparatus according to claim 3, wherein
   Said detector detects each frequency offset of the received wave from a plurality of mobile stations, and wherein
   said frequency controller controls the transmission frequency for each mobile station in response to each of the detected frequency offset.

5. A mobile station apparatus for transmitting/receiving a radio wave to/from a base transceiver station, comprising:
   a receiver that receives frequency control information, commanding a transmission frequency control of a carrier wave, generated based on a frequency offset of a received wave from the mobile station, and transmitted by each of a plurality of base transceiver station;
   a frequency controller that controls a transmission frequency of a carrier wave for transmitting a signal to the base transceiver station, the transmission frequency being set to a frequency which reduces the frequency offset in the base transceiver station based on the frequency control information received by the receiver; and
   a voltage control oscillator used for generating the carrier wave, wherein
   the transmission frequency of the carrier wave is controlled using at least one of the frequency control information among a plurality of the frequency control information received from the plurality of base transceiver stations, based on reception quality from each of the plurality of base transceiver stations,
   wherein said frequency controller controls the transmission frequency independently of a frequency control of a periodic wave for down-converting the received signal from the base transceiver station, and
   wherein
   said frequency controller controls the transmission frequency by controlling input voltage of said voltage control oscillator based on the frequency control information.

6. The mobile station apparatus according to claim 5, wherein said frequency controller controls the transmission frequency by giving a phase rotation instructed by the frequency control information to a transmission symbol to the mobile station in a base band region.

7. A mobile communication system having a first communication apparatus and a second communication apparatus for transmitting/receiving a radio wave to/from each other, said system comprising:
   a detector, provided in the first communication apparatus, that detects a frequency offset (Δf) of a received wave from the second communication apparatus; and
   a first frequency controller, provided in the first communication apparatus, that controls the transmission frequency of a carrier wave for transmitting a signal to the second communication apparatus so as to cancel Doppler shift, which occurs in a radio link between the first communication apparatus and the second communication apparatus, based on the frequency offset detected by said detector by controlling a downlink transmission frequency to approach $f_0-\Delta f/2$, where $f_0$ is a carrier wave frequency.

8. A mobile communication system having a plurality of first communication apparatuses and a second communication apparatus for transmitting/receiving a radio wave to/from each other, said system comprising:
   a detector, provided in each of the first communication apparatuses, that detects a frequency offset of a received wave from the second communication apparatus;
   a generator, provided in each of the first radio communication apparatuses, that generates frequency control information including an instruction for canceling the frequency offset detected by said detector;
   a transmitter, provided in each of the first radio communication apparatuses, that transmits the frequency control information generated by the generator;
   a receiver, provided in the second communication apparatus, that receives the frequency control information, commanding a transmission frequency control of a carrier wave, generated and transmitted by each of the plurality of the first communication apparatuses; and
   a second frequency controller, provided in the second communication apparatus, that controls the transmission frequency of a carrier wave for transmitting a signal from the second communication apparatus to at least one of the first communication apparatuses based on the frequency control information received by the receiver, the transmission frequency being set to a frequency which reduces the frequency offset, wherein
   the transmission frequency of the carrier wave is controlled using at least one of the frequency control information among a plurality of the frequency control information received from the plurality of first communication apparatuses, based on reception quality from each of the plurality of first communication apparatuses, and wherein
a slot with a region for multiplexing the frequency control information is used when each of the first communication apparatuses is a base transceiver station provided in a location where occurrence of a Doppler shift is predicted, and the second communication apparatus is a mobile station, and wherein
a slot without the region for multiplexing the frequency control information is used when each of the first communication apparatuses is a base transceiver station provided in a location where occurrence of a Doppler shift is not predicted, and the second communication apparatus is a mobile station.

9. The mobile communication system according to claim 8, wherein
said second frequency controller generates either one of the transmission frequency or the reception frequency, which is a frequency of a periodic wave for down-converting the received signal from the first communication apparatus, by adding a Doppler shift frequency to a reference frequency, and wherein
said second frequency controller generates the other one of the transmission frequency or the reception frequency by subtracting the Doppler shift frequency from the reference frequency.

10. The mobile communication system according to claim 8, wherein the frequency control information is binary information instructing the transmission frequency to be increased or to be decreased.

11. The mobile communication system according to claim 8, wherein the frequency control information comprises binary information instructing the transmission frequency to be increased or to be decreased and information for instructing an update step.

12. The mobile communication system according to claim 8, wherein the frequency control information is information indicating the frequency offset detected by said detector.

13. The mobile communication system according to claim 8, wherein said second frequency controller controls the transmission frequency of the carrier wave only when the frequency offset detected by said detector continuously exceeds an offset threshold for a prescribed time period.

14. The mobile communication system according to claim 8, wherein
a slot with a region for multiplexing the frequency control information is used when the frequency offset detected by said detector continuously exceeds an offset threshold for a prescribed time, and wherein
a slot without the region for multiplexing the frequency control information is used when a condition on the frequency offset is not met.

15. The mobile communication system according to claim 8, wherein
the frequency control information is transmitted using a predetermined region in a slot when the frequency offset detected by said detector continuously exceeds an offset threshold for a prescribed time, and wherein
the predetermined region is set to a signal absence state when a condition on the frequency offset is not met.

16. A mobile communication system comprising a mobile station and a plurality of base transceiver stations, comprising:
a generator, provided in each of the base transceiver stations, that generates frequency control information based on a frequency offset of a received wave from the mobile station;
a transmitter, provided in each of the base transceiver stations, that transmits the frequency control information by the generator;
a receiver, provided in the mobile station, that receives the frequency control information, commanding a transmission frequency control of a carrier wave, generated and transmitted by each of the plurality of base transceiver stations; and
a frequency controller, provided in the mobile station, that controls a transmission frequency for transmitting a signal to a base transceiver station using at least one of the frequency control information among a plurality of the frequency information received from the plurality of base transceiver stations, based on reception quality from each of the plurality of base transceiver stations,
wherein said frequency controller combines frequency control information from each of base transceiver stations using reception quality of a signal from each of the base transceiver stations as weights, and controls the transmission frequency based on the weighted combination result, when the mobile station is in a handover state.

17. The mobile communication system according to claim 16 wherein said frequency controller controls the transmission frequency based on frequency control information from a base transceiver station with the best reception quality, when the mobile station is in handover state.

18. The mobile communication system according to claim 16 wherein the mobile station demodulates only a received signal from a base transceiver station with the best reception quality, when in a handover state and when controlling a transmission frequency using frequency control information from one of more of base transceiver station.

19. The mobile communication system according to claim 16 wherein the mobile station performs propagation path estimation while compensating for a frequency offset in accordance with the frequency control information for each base transceiver station, when in a handover state and when controlling a transmission frequency using frequency control information from one or more of base transceiver station.

20. A mobile communication system comprising a mobile station and a plurality of base transceiver stations, comprising:
a generator, provided in each of the base transceiver stations, that generates frequency control information based on a frequency offset of a received wave from the mobile station;
a transmitter, provided in each of the base transceiver stations, that transmits the frequency control information by the generator;
a receiver, provided in the mobile station, that receives the frequency control information, commanding a transmission frequency control of a carrier wave, generated and transmitted by each of the plurality of base transceiver stations; and
a frequency controller, provided in the mobile station, that controls a transmission frequency for transmitting a signal to a base transceiver station using at least one of the frequency control information among a plurality of the frequency information received from the plurality of base transceiver stations, based on reception quality from each of the plurality of base transceiver stations,
wherein the mobile station adjusts a time constant of propagation path estimation performed in demodulation of a received signal to be shorter compared to normal time, when in a handover state and when controlling a transmission frequency using frequency control information from one or more of base transceiver station.

21. The mobile communication system according to claim 20 wherein said frequency controller controls the transmission frequency based on frequency control information from a base transceiver station with the best reception quality, when the mobile station is in handover state.

22. The mobile communication system according to claim 20 wherein the mobile station demodulates only a received signal from a base transceiver station with the best reception quality, when in a handover state and when controlling a transmission frequency using frequency control information from one of more of base transceiver station.

23. The mobile communication system according to claim 20 wherein the mobile station performs propagation path estimation while compensating for a frequency offset in accordance with the frequency control information for each base transceiver station, when in a handover state and when controlling a transmission frequency using frequency control information from one or more of base transceiver station.

* * * * *